US012579505B2

(12) United States Patent
Winkler et al.

(10) Patent No.: US 12,579,505 B2
(45) Date of Patent: Mar. 17, 2026

(54) METHOD FOR THE COMPUTER-AIDED PROCESSING OF A STATUS CHANGE OF A GOODS CARRIER IN A STORAGE AND PICKING SYSTEM, AND STORAGE AND PICKING SYSTEM

(71) Applicant: TGW Logistics GmbH, Marchtrenk (AT)

(72) Inventors: Markus Winkler, Altmuenster (AT); Pascal Möller, Unterweitersdorf (AT)

(73) Assignee: TGW Logistics GmbH, Marchtrenk (AU)

( * ) Notice: Subject to any disclaimer, the term of this patent is extended or adjusted under 35 U.S.C. 154(b) by 306 days.

(21) Appl. No.: 18/030,531

(22) PCT Filed: Oct. 6, 2021

(86) PCT No.: PCT/AT2021/060363
§ 371 (c)(1),
(2) Date: Jun. 5, 2023

(87) PCT Pub. No.: WO2022/073052
PCT Pub. Date: Apr. 14, 2022

(65) Prior Publication Data
US 2024/0020632 A1     Jan. 18, 2024

(30) Foreign Application Priority Data

Oct. 7, 2020     (AT) .............................. A 50858/2020

(51) Int. Cl.
*G06Q 10/087*          (2023.01)
*B65G 1/137*           (2006.01)

(52) U.S. Cl.
CPC ......... *G06Q 10/087* (2013.01); *B65G 1/1378* (2013.01)

(58) Field of Classification Search
CPC ........... G06Q 10/087; G06Q 10/08355; B65G 1/1378; B65G 1/0407; G06F 30/20
See application file for complete search history.

(56) References Cited

U.S. PATENT DOCUMENTS 10,399,778 B1     9/2019  Shekhawat et al.
11,287,799 B2     3/2022  Albrecht et al.
(Continued)

FOREIGN PATENT DOCUMENTS

DE     10 2018 215 560 A1     3/2020

OTHER PUBLICATIONS

International Search Report in PCT/AT2021/060363, mailed Feb. 23, 2022.
(Continued)

*Primary Examiner* — A. Hunter Wilder
*Assistant Examiner* — Kimberly S. Bursum
(74) *Attorney, Agent, or Firm* — Collard & Roe, P.C.

(57)          ABSTRACT

In a method for the computer-aided processing of a status change of an article carrier in a picking system, a storage and conveying region of the picking system, along with article carriers located thereupon, are virtualized in a computer. Pieces of status change information relating to a change in a physical status of an article carrier and/or relating to a change in a status of a control program for the article carrier are provided by an assigned digital twin of the article carrier and for digital twins of other article carriers. Further, a picking system carries out the method.

24 Claims, 8 Drawing Sheets

(56) References Cited

U.S. PATENT DOCUMENTS

| | | | | |
|---|---|---|---|---|
| 2017/0330457 | A1* | 11/2017 | Bhalla | G08G 1/093 |
| 2020/0029268 | A1* | 1/2020 | Russell | H04W 12/06 |
| 2021/0287459 | A1* | 9/2021 | Cella | G07C 5/0808 |
| 2022/0048186 | A1* | 2/2022 | Sharma | G06F 11/3006 |
| 2022/0156665 | A1* | 5/2022 | Beth | G05D 1/0276 |
| 2022/0187847 | A1* | 6/2022 | Cella | G05B 19/41885 |

OTHER PUBLICATIONS

Braglia, M. et al. "Using RFID technology and Discrete-Events, Agent-Based simulation tools to build Digital-Twins of large warehouses", 2019 IEEE International Conference on RFID Technology and Applications (RFID-TA), IEEE, Sep. 25, 2019, pp. 464-469, XP033648998, total of 6 pages.
Korth, Benjamin et al. "Simulation-ready digital twin for realtime management of logistics systems", 2018 IEEE International Conference on Big Data (Big Data), IEEE, Dec. 10, 2018, pp. 4194-4201, XP033508145, total of 8 pages.
Yao, Fengjia et al. "Optimizing the Scheduling of Autonomous Guided Vehicle in a Manufacturing Process", 2018 IEEE, pp. 264-269, total of 6 pages.
Petkovic, Tomislav et al. "Human Intention Estimation based on Hidden Markov Model Motion Validation for Safe Flexible Robotized Warehouses", Preprint submitted to Robotics and Computer-Integrated Manufacturing, Nov. 21, 2018, total of 17 pages.
Leng, Jiewu et al: "Digital twin-driven joint optimisation of packing and storage assignment in large-scale automated high-rise warehouse product-service system", International Journal of Computer Integrated Manufacturing, GB, vol. 34, No. 7-8, Sep. 29, 2019, pp. 783-800, XP055880852, total of 19 pages.

* cited by examiner

METHOD FOR THE COMPUTER-AIDED PROCESSING OF A STATUS CHANGE OF A GOODS CARRIER IN A STORAGE AND PICKING SYSTEM, AND STORAGE AND PICKING SYSTEM

CROSS REFERENCE TO RELATED APPLICATIONS

This application is the National Stage of PCT/AT2021/060363 filed on Oct. 6, 2021, which claims priority under 35 U.S.C. § 119 of Austrian Application No. A 50858/2020 filed on Oct. 7, 2020, the disclosure of which is incorporated by reference. The international application under PCT article 21(2) was not published in English.

BACKGROUND OF INVENTION

1. Field of the Invention

The invention relates to a method for the computer-aided processing of a status change of an article carrier in a picking system, wherein the article carrier has an article reception for storing and/or conveying at least one article in the picking system and wherein multiple articles are stored, conveyed and picked in the picking system. In a first step, a digital and/or virtual storage and conveying region, which corresponds to a digital, two or three-dimensional model of a real and/or physical storage and conveying region of the picking system, is generated and stored in a computer. In another step, digital and/or virtual article carriers, which correspond to digital article carrier models of the real and/or physical article carriers, are generated and stored in the computer. Finally, a piece of status information relating to a physical status of a first real article carrier of the real article carriers is detected and provisioned using at least one sensor, and/or a piece of status information relating to a status of a control program for the first real article carrier is provisioned by the control program, wherein the control program runs in a control of the first real article carrier.

Further, the invention relates to a picking system for storing, conveying and picking multiple articles, comprising a real and/or physical storage and conveying region, as well as multiple real and/or physical article carriers with an article reception each for storing and/or conveying at least one article each of the articles in the picking system. Further, the picking system comprises a computer for generating and storing a digital and/or virtual storage and conveying region, which corresponds to a digital, two or three-dimensional model of the real, physical storage and conveying region, and for generating and storing digital and/or virtual article carriers, which correspond to digital article carrier models of the real, physical article carriers, in the digital storage and conveying region. Finally, the picking system comprises at least one sensor for detecting and provisioning a piece of status information relating to a physical status of a first real article carrier of the real article carriers and/or a control of a first real article carrier of the real article carriers, wherein a control program for the first real article carrier is executable in the control, wherein a piece of status information relating to a status of same is provisionable by the control program.

2. Description of the Related Art

Such a method and such a picking system are generally known. By way of example, mention is made of DE 10 2018

215 560 A1, in this context. In such systems, a virtual image of the real world is therefore generated in a computer and used for control tasks and suchlike. This procedure is also referred to as "virtualization" and the digital models or images of the real article carriers as "digital twins."

An important aspect in the design and the operation of such systems is the division of tasks between real and virtual worlds, as well as the distribution of information inside the system. The virtual image of a picking system is often a mere copy without an active function. The actual communication and control, in contrast, are done in the real world. Therefore, known systems often fall considerably short of the opportunities of virtualization that present themselves. Also the comprehensive control of highly diverse means, which, as a rule, also come from different manufacturers and often offer only proprietary control and communication options, is generally problematic in a picking system. This means that many means in a picking system work according to proprietary and non-standardized protocols.

SUMAMRY OF THE INVENTION

It is therefore an object of the invention to specify an improved method for the computer-aided processing of a status change of an article carrier, as well as an improved picking system. In particular, the superordinate control of highly diverse means in a picking system and the communication between these means are to be improved.

The object of the invention is achieved with a method of the kind mentioned in the beginning, wherein the first digital article carrier of the digital article carriers, which is assigned to the first real article carrier, obtains (i.e. in particular determines or receives) pieces of status information of this first real article carrier provisioned at different points in time, or a piece of status change information describing a change in the provisioned pieces of status information of this first real article carrier, and provisions (i.e. in particular transmits or deposits) these pieces of status information, or this piece of status change information, or a piece of status change information derived from the pieces of status information, to (and/or for) a second digital article carrier of the digital article carriers.

Further, the object of the invention is achieved by a picking system of the kind mentioned in the beginning in which a program is executable in the computer in order to obtain (i.e. in particular determine or receive) pieces of status information of this first real article carrier provisioned at different points in time, or a piece of status change information describing a change in the provisioned pieces of status information of this first real article carrier, in the first digital article carrier of the digital article carriers, which is assigned to the first real article carrier, and provision (i.e. in particular transmit or deposit) these pieces of status information, or these pieces of status change information, or a piece of status change information derived from the pieces of status information to (and/or for) a second digital article carrier of the digital article carriers.

The proposed measures ensure that the communication between article carriers in a picking system is decoupled from the physical level and the restrictions existing there are subsequently no longer relevant and/or are circumvented. Accordingly, in particular the communication between article carriers which come from different manufacturers and offer only proprietary control and communication options is possible. This means that the proposed measures enable in particular the communication between article carriers which work according to proprietary and non-standardized protocols and can therefore not communicate with one another in the real world. Specifically, the notification of a status change in a first real article carrier is done to a second digital article carrier. This ensures that the comprehensive control of highly diverse means in a picking system is facilitated, or even enabled in the first place.

In a "picking system," articles can, for example, be delivered to and taken over at an article receiving area, optionally be repacked and stored in an article storage. The articles can also be picked in accordance with an order, i.e. be retrieved from the article storage, compiled for an order and provisioned for shipping at the article issue area. In contrast to a manufacturing process, the articles are not substantially changed between the article receiving area and the article issue area. Within the scope of the invention, "picking" is to be understood to mean the compiling of ordered articles for a picking order.

"Articles" are generally objects of the trade in goods and are delivered at the article receiving area and shipped to a customer in accordance with an order at the article issue area. Within the scope of the invention, (an) "article(s)" is/are in particular understood to mean an object that can be handled individually and/or a group of objects that can be handled individually. (An) article(s) can be, for example, an item of clothing, for example a "shirt, white, size 42" or "denim pants, size 34/34," a food, for example a pack of "tagliatelle, 1 kg" or a bottle of "tomato sauce," an electronic device, for example a cell phone, or (an) article(s) of a different kind.

A "storage and conveying region" serves the storage and/or conveyance of articles. In particular, this includes warehouses with storage and retrieval units, stationary conveyor plants, as well as travel surfaces for manned conveying vehicles and (unmanned) autonomous conveying vehicles. Spaces or regions which do not serve the storage and/or conveyance of articles, are not counted among the storage and conveying region. Such spaces are, for example, office spaces, sanitary facilities, break rooms, spaces with operational plants (e.g. spaces with electric switch cabinets, air conditioning units, compressors and suchlike). A differentiation is made between a "real storage and conveying region" and its digital model or image, for which the term "digital storage and conveying region," or also "virtual storage and conveying region," is used within the scope of this disclosure. Such digital images or models are also known by the term "digital twin." In essential properties, the model of the real storage and conveying region corresponds to the real storage and conveying region. It can have a two or three-dimensional structure. The digital storage and conveying region can also be graphically represented in the computer.

The creation of the model of the real storage and conveying region can generally comprise the taking of the measurements of the real storage and conveying region, for example with a laser scanner, with a measuring tape or with a laser distance measurement device. Yet also design data of the storage and picking system (e.g. CAD data) can generally be used for the making of a model of the real storage and conveying region. It is also of advantage if a measurement-based model of the storage and conveying region is matched against design data of the picking system (e.g. against CAD data). In this way, the model of the storage and conveying region determined via measuring is harmonized (as much as possible) with design data of same. In this way, for example measuring errors, and also deviations of the real picking system from a map of the picking system based on design data, can be corrected.

Within the scope of the invention, the term "article carrier" is to be understood broadly and includes any and all means having an article reception for storing and/or conveying at least one an article each. Therefore, this particularly includes all kinds of stationary conveying devices (in particular band conveyors, chain conveyors, vertical conveyors, lifts, paternosters and suchlike), mobile conveying devices, in particular storage and retrieval units (single-level and multi-level storage and retrieval units), manned conveying vehicles or unmanned (autonomous) conveying vehicles, and suchlike, and/or storage racks. Yet article carriers can also be configured as loading aids (trays, containers, boxes, pallets, and suchlike). Article carriers can also transport articles on multiple hierarchy levels. For example, (an) article(s) can be lying on a tray (first hierarchy level) which is transported on an autonomous conveying vehicle (second hierarchy level) which, in turn, is vertically transported by a lift (third hierarchy level). A differentiation is made between a "real article carrier" and its digital model or image, for which the term "digital article carrier," or also "virtual article carrier," is used within the scope of this disclosure. Such digital images or models are also known by the term "digital twin." In essential properties, the model of the real article carrier corresponds to the real article carrier. It can have a two or three-dimensional structure. In particular, position and alignment of the real article carrier in the real storage and conveying region are continuously matched against and/or synchronized with the position and alignment of the digital article carrier in the digital storage and conveying region. A change in position and alignment of the real article carrier results in a corresponding change in position and alignment of the digital article carrier, and vice versa. A digital article carrier can also be graphically represented in the computer. The model of the real article carrier comprises, in particular, its dimensions, yet it may furthermore comprise other parameters, such as, for example, the weight of the article carrier, the position of a lifting fork of the article carrier (retracted/extended), a position of steerable wheels, and much more. The degree of accuracy in the creation of the model depends on how accurately the virtual world is to imitate the real world and what computing power is available to do this. Of course, the synchronization mentioned above can also comprise these other statuses, i.e. for example the position of a lifting fork of the article carrier, a position of steerable wheels, and much more.

An "article reception" may comprise a flat receiving surface, on which (an) article(s) can be placed or another article carrier can be deposited (compare the hierarchy levels mentioned above). Yet the receiving surface can also be shaped differently and also be modifiable in terms of its shape, such as this is the case for hanging bags, for example. Yet an article reception can also be configured by the gripper of a robot, for example. Receiving surfaces in the picking system, on which receiving surfaces (an) article(s) can, in principle, be placed but which are not intended for this, are not article receptions in accordance with the invention. For example, (an) article(s) could be placed on a railing in the picking system, yet the railing is intended neither for the article storage nor for the article conveyance. The railing, therefore, has no article reception and accordingly does not form an article carrier. The definition of the article reception and/or of the article carrier imperatively includes the intended use for the article storage and/or article conveyance; the mere potential possibility of it is not sufficient.

Within the scope of the invention, a "computer" refers to a computer which can (bidirectionally) communicate with, and control, means of the picking system, in particular real article carriers and/or real means for influencing the article conveyance. The communication can be wireless or wired. There is, therefore, a communicative connection between the computer and the real article carriers and/or a communicative connection between the computer and the real means for influencing the article conveyance. To this end, a communication network, in particular a wireless communication network, can be provided.

The real article carriers and/or means for influencing the article conveyance can comprise sensors, and the sensor signals can be transmitted to the computer. The real article carriers and/or means for influencing the article conveyance can also comprise drives, and the computer can transmit control signals to the drives, as well as receive feedback from the drives.

The virtualization of the picking system is also done in the computer. The control and communication, as well as the virtualization, do not imperatively run on a single computer but can also run on multiple computers. The term "computer" can therefore also be understood to mean a computer cluster or a computer network, which can in particular also comprise cloud solutions. The "computer" can furthermore also be used for the acquisition of orders and/or awarding of orders in the picking system.

Within the scope of the invention, a "control for an article carrier" refers to a local electronic control, which is assigned to a single article carrier and with which the computer communicates. In this way, control tasks can be divided up hierarchically. For example, the control for the article carrier assumes basic tasks such as, for example, controlling a speed or avoiding a collision, whereas the superordinate computer specifies, for example, where (an) article(s) is/are to be picked up and where it/they is/are to be transported. Here, the route planning can be done in the computer or in the control of the article carrier. The program running in the control of the article carrier for the execution of the tasks is the "control program." It would also be conceivable that the route planning is preferably done in the control of the article carrier but can also be executed by the computer as and when needed. In particular, it can also be provided that the computer discards and/or overwrites the route planned by the control of the article carrier as and when needed.

A "status" of the article carrier can relate to different aspects of the article carrier: on the one hand statuses detected by sensors, on the other hand statuses of a control program of the article carrier. Examples of statuses of the article carrier that can be detected by a sensor are a pose of the article carrier, an electric current of a drive of the article carrier, a state of charge of a battery of the article carrier, a filling level of a fuel tank of the article carrier, a switching position of a switch of the article carrier, and so on. With regard to statuses relating to a control program of the article carrier, it can be specified, for example, whether the control program is currently in a start-up sequence (boot sequence), the control software is rendered up-to-date (updated) or the article carrier is in normal operation. It can also be specified, for example, whether the article carrier is currently executing a transport order for transporting (an) article(s) or is available for such a transport order. It should be noted here that the above enumerations are merely for illustration and the statuses are not restricted to the adduced examples.

The "status information" is a piece of information on the status, i.e. for example a notification or description relating to the pose of the article carrier, the state of charge of a battery of the article carrier, the order occupancy of the article carrier, and so on. The notification or description can be done in written form, or also using symbols and suchlike.

A "status change" is a change of a status, i.e. for example a change in the pose of the article carrier, a change in the state of charge of a battery of the article carrier, a change with regard to the order occupancy, and so on.

A "piece of status change information" is a piece of information on a status change, i.e. for example a notification or description relating to a change in the pose of the article carrier, a change in the state of charge of a battery of the article carrier, a change with regard to the order occupancy, and so on. Again, the notification or description can be done in written form, or also using symbols and suchlike.

It should be noted in this context that the piece of status change information need not necessarily represent a specific piece of information derived from a status but can also be the mere combination of two, or multiple, pieces of status information, which represent a status at two, or multiple, different points in time. This means that the provisioning of two pieces of status information, which represent a status at two different points in time, in a store, in a message or in a report corresponds to the provisioning of a piece of status change information within the scope of the invention.

It should further be noted that the provisioning of two pieces of status information does not imperatively require the presence of an actual status change. Namely, it does not constitute a status change if the two, or multiple, provisioned pieces of status information are identical. The provisioning of two pieces of status information, therefore, merely enables the identifying of a status change. Yet the mere presence of two pieces of status information does not automatically mean that there is a status change.

Within the scope of the invention, a "piece of status change information" can therefore be "an implicit piece of status change information," which refers to the combination of two, or multiple, pieces of status information, which represent a status at two, or multiple, different points in time without providing explicit information on a status change. Yet a "piece of status change information" can also be an "explicit piece of status change information," which provides direct information on an identified status change.

The difference shall be elucidated using the example of a state of charge of a drive battery of the first real article carrier. The combination of the pieces of status information "state of charge old 95%"/"state of charge new 90%" received at different points in time constitutes an implicit piece of status change information, whereas the piece of status change information "state of charge changed" constitutes an explicit piece of status change information. If the state of charge remains the same, the situation presents itself as follows: The implicit piece of status change information, in this case, is "state of charge old 95%"/"state of charge new 95%," and the explicit piece of status change information is "state of charge unchanged."

It is also conceivable that a piece of status change information, within the scope of the method presented, is generated only as and when there is an actual status change. This means that an explicit piece of status change information, in this case, is generated only as and when a change of a status is identified. Likewise, it can also be provided that an implicit piece of status change information is rendered up-to-date only as and when there is a status change. Within the scope of the invention, such pieces of status change information are referred to as "dedicated pieces of status change information," i.e. specifically as a "dedicated implicit piece of status change information" and "dedicated explicit piece of status change information." Alternatively, also the term "active pieces of status change information" can be used.

Within the scope of this disclosure, the "determining" of a piece of status information, or piece of status change information, comprises the active procuring of the respective piece of information and can be the active reading out of a provisioned piece of information, or can mean the active inquiring about and, on this basis, the subsequent receiving of this piece of information.

Within the scope of this disclosure, the "receiving" of a piece of status information, or piece of status change information, comprises the receiving of the respective piece of information, namely both on the basis of an active inquiry and without such an explicit inquiry.

Within the scope of this disclosure, "obtaining" a piece of status information, or piece of status change information, is the generic term for "determining" and "receiving" and can therefore be both the active procurement of a piece of status information, or piece of status change information, or the receiving of a piece of status information, or piece of status change information, during a transmission.

Within the scope of this disclosure, the "transmitting" of a piece of status information, or piece of status change information, comprises the active sending of the respective piece of information to an addressee (e.g. to a digital article carrier or to a digital means for influencing the article conveyance), namely both on the basis of an inquiry by the addressee and without such an inquiry. A transmission to an undetermined circle of recipients ("broadcasting") would also be conceivable.

Within the scope of this disclosure, the "reporting" of a piece of status information, or piece of status change information, comprises the active sending of the respective piece of information to an addressee without an assigned, explicit inquiry. "Reporting" is therefore a special case of "transmitting."

Within the scope of the invention, the term "depositing" a piece of status information, or piece of status change information, means that the respective piece of information is made available for reading out and/or is placed at the disposal for reading out to another party (e.g. to a digital article carrier, or to a digital means for influencing the article conveyance), in particular to an undetermined, other party. The piece of information can be deposited in a store of the depositing means, or also in a different store, to which the depositing means transmits the respective piece of information. If the first real article carrier is the depositing means, a piece of status information, or a piece of status change information, can be deposited in a store of the control of the first real article carrier, or in a central reporting store, which is at the disposal of multiple article carriers.

Within the scope of this disclosure, "provisioning" a piece of status information, or piece of status change information, is the generic term for "transmitting" and "depositing" and can therefore be both the active sending of a piece of status information, or piece of status change information, and the depositing of a piece of status information, or piece of status change information.

Within the scope of this disclosure, the "identifying" or "evaluating" includes in particular the identifying of a status change by comparing the pieces of status information determined or received at two different points in time. In particular, the "identifying" or "evaluating" comprises the deriving and/or the generation of a dedicated piece of status change information. To that end, in particular sensor signals, or also statuses of the control program, are evaluated.

The detection of a status, or of a status change, and the provisioning of a piece of status information, or piece of status change information, can be done by the sensor or the control program themselves, or by a query from outside the real article carrier. A returning (i.e. repeated) query can be done in a cyclical or in an event-based manner, for example upon the fulfillment of a specific condition or upon the occurrence of an interrupt. The cyclical querying of sensor signals is also known by the term "polling." The provisioning of a piece of status information, or piece of status change information, which relates to a status of the control program, can be done, for example, upon the fulfillment of a specific condition, or also using interrupts. Accordingly, the first digital article carrier can identify a status change of the first real article carrier by obtaining a piece of status change information from the first real article carrier, by obtaining pieces of status information at different points in time from the first real article carrier and matching these against one another, by reading out or querying pieces of status information and/or data (i.e. sensor signals or program statuses) at different points in time at the first real article carrier and matching them against one another or by reading out, or querying, a piece of status change information from the first real article carrier. An active reporting of a status change on the part of the first real article carrier need also not be done immediately after the occurrence of the status change, but it can also be provided that the first real article carrier reports the status changes occurring in a time interval (e.g. also coming from multiple sensors) in a cyclical and pooled manner. Also the polling can yield multiple status changes, of course. As mentioned above, it can therefore be stated that the determining of a piece of status information, or of a piece of status change information, by the first digital article carrier can mean the reading out of a data set from a sensor, or from the control, of the first real article carrier or the requesting of a corresponding report from the first real article carrier.

Sensors that come into consideration for the detection of physical parameters or status changes are, for example, a current sensor, a voltage sensor, a position sensor, an acceleration sensor, a gyro sensor, a rotary encoder, a camera, a depth sensor, an ultrasonic sensor, a laser scanner, a light barrier, a force sensor or a weight sensor. Also a combination of different sensors is possible. Again, the enumeration is merely for illustration, and the statuses are not restricted to the adduced examples. The detection of the status and/or of a status change is also in no way bound to being detected with a sensor which is arranged on, or in, the article carrier. Rather, also the detection with external sensors that are separate from the article carrier is conceivable. For example, cameras arranged in the (real) picking system can serve, for example, to acquire the position and the alignment of an article carrier, or the distance to and the direction towards an obstacle.

The "conveying system" generally serves the transport of articles with or without loading aids. In particular, the conveying system can be divided into different functional regions, for example a "storage conveying system," which serves to transport articles from the article receiving area to a storage region, a "retrieval conveying system," which serves to transport articles from the storage region to a picking station, and so on. The conveying system can comprise "stationary/fixedly installed conveying devices" and/or "mobile conveying devices." The "mobile conveying devices" are formed by conveying vehicles.

"Stationary conveying devices" require permanently integrated means for transporting articles. Stationary conveying devices are in particular to be understood to mean roller conveyors, band conveyors, chain conveyors, lifts, paternosters and suchlike.

Within the scope of the invention, "conveying vehicles" are to be understood to mean, in particular, self-propelled driverless conveying vehicles and/or autonomous guided vehicles ("automated guided vehicle," "AGV" in short, or "automated mobile robot," "AMR" in short) for transporting articles with or without loading aids, which self-propelled driverless conveying vehicles and/or autonomous guided vehicles travel along permanently specified paths or which are guided freely, i.e. without fixed track guidance. Each autonomous guided vehicle comprises a chassis with a drive unit and, arranged on the chassis, an article reception for receiving, dispensing and transporting articles with or without loading aids. The article reception can also be formed by a hanger rod and/or overhead conveyor for receiving hanging bags, or hanging articles suspended on article transport carriers and/or coat hangers. For example, the article reception can be permanently affixed to the conveying vehicle, yet the article reception can also be vertically and/or laterally movable relative to a chassis of the conveying vehicle, for example in order to be able to store articles in a storage rack and retrieve them from the storage rack. At least one of the wheels of the drive unit is steerable, unless the autonomous conveying vehicle has wheels with which also a lateral movement can be executed (e.g. Mecanum wheels). An autonomous guided vehicle also comprises sensors for capturing the surroundings of the guided vehicle and for spatial orientation. Different technologies for the navigation of the autonomous guided vehicles are generally known. For example, in addition to the track-guided, inductive or optical navigation, also a laser navigation is used, in which each guided vehicle is equipped with a laser scanner, with which stationary or natural reference points in the surroundings can be detected, and the guided vehicle is navigated on the basis of the detected surrounding characteristics. Yet the locating of the autonomous guided vehicle can also be done, for example, by triangulation, distance measurement or travel-time measurement, for instance using indoor GPS (Global Positioning System), Bluetooth or WLAN (wireless local area network). For example, the position of the guided vehicle is therefore determined by measuring the distance to reference points whose position is known, by measuring the travel time of a (radio) signal between the guided vehicle and such reference points and/or by measuring an angle to such reference points. The travel time of a signal, in turn, can be used to compute the distance to this reference point, as the signal speed is known. In particular, the reference point can be formed by a transmitting and/or receiving station for a (radio) signal and, in particular, work according to the standard for GPS, Bluetooth or WLAN. It should be noted in this context that the locating of the guided vehicles on the basis of triangulation, distance measurement or travel-time measurement can be done by the guided vehicle itself, or also by the central computer if it is in communicative connection with the transmitting and/or receiving station mentioned above. An acceleration sensor can be used, for example, to determine curvatures of the track (e.g. bends, switches, slopes, etc.). Yet a displacement measurement would generally also be possible with the acceleration sensor if the sensor signal is time-integrated accordingly.

It should further be noted in this context that the adduced possibilities for the locating of an autonomous guided vehicle can also be applied to other kinds of article carriers. Also article carriers that are transported on a stationary conveying device are generally locatable in the manners specified above. Yet the locating of article carriers can also be done, for example, using rotation signals, which are determined in motor drives of the conveying device (e.g. via a hall effect sensor of a brushless DC motor, via the control signals for a drive motor, or also via a rotary encoder in the drive motor or in the drivetrain). For example, the rotation signals can be used to compute route signals, in turn, on the basis of the circumference of a rotating conveyor roller of a conveying device. Alternatively, or additionally, also light barriers, cameras, barcode readers and/or RFID readers that are arranged along the conveying system can be used for locating the article carriers. In that case, stationary light barriers, cameras, barcode readers and RFID readers serve predominantly to determine the absolute position of the article carriers, whereas route and rotation signals serve to determine the relative position of the article carriers on the basis of a reference location. The reference location can in particular be a stationary light barrier, or camera, or a stationary barcode reader, or RFID reader.

Within the scope of the invention, a "storage and retrieval unit" is a conveying vehicle operated in an automated manner which travels on rails and can be configured as a single-level storage and retrieval unit (also called "shuttle") or as a multi-level storage and retrieval unit.

A "mobile rack" is a movable rack which is not fixed at a specific location. A mobile rack can in particular comprise wheels for easier transport.

An "overhead conveyor" is a conveyor on which hanging bags, or article transport carriers, can be stored and/or transported in a suspended manner. Accordingly, an "overhead storage conveyor" is an overhead conveyor on which hanging bags, or article transport carriers, can be stored in a suspended manner. An "overhead transport conveyor" is an overhead conveyor via which hanging bags, or article transport carriers, can be transported in a suspended manner. A "mobile overhead storage conveyor" is a movable overhead conveyor which is not fixed at a specific location. A mobile overhead storage conveyor can in particular have a structure similar to that of a mobile rack and equally have wheels for easier transport.

Advantageous designs and further advancements of the invention result from the description in combination with the figures.

It is advantageous if a) the first digital article carrier repeatedly obtains the provisioned piece of status information of the assigned first real article carrier and provisions this piece of status information to the second digital article carrier of the digital article carriers and if the second digital article carrier repeatedly obtains the piece of status information provisioned by the first digital article carrier and identifies a status change of the first real article carrier by a change in the piece of status information between two points in time or b) the first digital article carrier repeatedly obtains the provisioned piece of status information of the assigned first real article carrier, derives an assigned piece of status change information therefrom, and provisions this piece of status change information to the second digital article carrier of the digital article carriers or c) the first digital article carrier obtains the piece of status change information, which describes a change in the provisioned pieces of status information of this first real article carrier, and provisions this piece of status change information to the second digital article carrier of the digital article carriers.

In case a), the first real article carrier therefore hands over pieces of status information, via the first digital article carrier, to the second digital article carrier, which can subsequently identify a status change of the first real article carrier by a change in the piece of status information between two points in time. In case b), in contrast, the first digital article carrier derives a piece of status change information from the provisioned pieces of status information and passes this piece of status change information on to the second digital article carrier. In case c), in contrast, the first real article carrier directly provisions a piece of status change information and passes it on, via the first digital article carrier, to the second digital article carrier.

It is favorable if the first real article carrier transmits the piece of status information to the first digital article carrier at different points in time and the first digital article carrier receives this piece of status information, or the first real article carrier deposits the piece of status information at different points in time and the first digital article carrier determines this piece of status information, or the first real article carrier transmits the piece of status change information to the first digital article carrier and the first digital article carrier receives this piece of status change information, or the first real article carrier deposits the piece of status change information and the first digital article carrier determines this piece of status change information.

This embodiment therefore describes advantageous possibilities for the transfer of information between the first real article carrier and the first digital article carrier, specifically the active transmitting of a piece of status information, or of a piece of status change information, to the first digital article carrier and the active determining of a piece of status information, or of a piece of status change information, by the first digital article carrier.

It is further favorable if the first digital article carrier transmits the piece of status information to the second digital article carrier at different points in time and the second digital article carrier receives this piece of status information, or the first digital article carrier deposits the piece of status information at different points in time and the second digital article carrier determines this piece of status information, or the first digital article carrier transmits the piece of status change information to the second digital article carrier and the second digital article carrier receives this piece of status change information, or the first digital article carrier deposits the piece of status change information and the second digital article carrier determines this piece of status change information.

This embodiment therefore describes advantageous possibilities for the transfer of information between the first digital article carrier and the second digital article carrier, specifically the active transmitting of a piece of status information, or of a piece of status change information, to the second digital article carrier and the active determining of a piece of status information, or of a piece of status change information, by the second digital article carrier.

It is advantageous if the first digital article carrier, in case b), derives a piece of status change information and provisions this piece of status change information to the second digital article carrier of the digital article carriers only as and when the first digital article carrier identifies a status change of the first real article carrier by a change in the piece of status information between two points in time. In other words, only dedicated pieces of status change information are provisioned to the second digital article carrier. This ensures that the effort for the provisioning of pieces of status change information is kept low, as a dedicated piece of status change information is only provisioned as and when there is actually a status change.

It is favorable if the status change of the first real article carrier received by the first digital article carrier is reported to the second real article carrier of the real article carriers by the second digital article carrier, which is assigned to the second real article carrier. In this way, a communication between the first real article carrier and the second real article carrier can be achieved without this communication having to take place in the real world. Therefore, restrictions in terms of different communication protocols of different article carriers (in particular coming from different manufacturers) which exist in the real, physical world can be overcome. The proposed procedure, therefore, enables in particular the communication between article carriers with different communication protocols which cannot communicate with one another in the real world, as the restrictions do not exist in the virtual world.

It is advantageous if the first digital article carrier repeatedly (in a cyclical or event-based manner) determines the piece of status information of the assigned first real article carrier and identifies a status change of the first real article carrier by a change in the piece of status information between two queries. This means that an active sending of statuses, or status changes, on the part of the real article carrier is not required in this embodiment. This embodiment has advantages in particular whenever additional real article carriers are purchased whose control software cannot be changed, or can be changed only to a very limited extent, as the proposed procedure requires practically no changes on the real article carrier. Instead, the active identifying of a status change, and optionally the provisioning of a corresponding piece of status change information, is done in the digital article carrier, i.e. in the digital twin.

It is also of advantage if the second digital article carrier determines the piece of status change information of the first digital article carrier repeatedly (in a cyclical or event-based manner). This means that an active sending of pieces of status change information on the part of the first digital article carrier is not required in this embodiment. This embodiment therefore follows the principle that units or parties (e.g. a digital article carrier, or a digital means for influencing the article conveyance) interested in a status change must actively inquire about this status change. The determining of a piece of status change information of the first digital article carrier can mean the reading out of a data set from the first digital article carrier or the requesting of a corresponding piece of information from the first digital article carrier. Yet the second digital article carrier can also pick up the piece of status change information from a central reporting store, in which the first digital article carrier deposits pieces of status change information.

It is particularly advantageous if both the first digital article carrier determines the piece of status information of the assigned first real article carrier repeatedly (in a cyclical or event-based manner) and identifies a status change of the first real article carrier by a change in the piece of status information between two queries and the second digital article carrier determines the piece of status change information of the first digital article carrier repeatedly (in a cyclical or event-based manner). Both are preferably done in that the inquiring unit and/or the inquiring party reads out the data. This means that the first digital article carrier preferably reads out the piece of status information of the assigned first real article carrier and also the second digital article carrier preferably reads out the piece of status change information of the first digital article carrier. An active response by the inquired unit/by the inquired party is not required in this case. Furthermore, the first real article carrier need not send any report to the first digital article carrier, and also the first digital article carrier need not send any report to the second digital article carrier. The distribution of the piece of status information and/or of the piece of status change information inside the system presented is therefore done in accordance with a uniform principle. Here, it is also particularly advantageous that the control of the first real article carrier need not be recoded, or need be only slightly recoded, to that end. The proposed embodiment variant is therefore in particular suited for applications in heterogeneous systems, for example in systems with real article carriers of different manufacturers which are each based on proprietary control software.

Furthermore, it is of advantage if the first digital article carrier determines the piece of status information of the assigned first real article carrier repeatedly (in a cyclical or event-based manner) and the second digital article carrier determines the piece of status information of the first digital article carrier repeatedly (in a cyclical or event-based manner) and identifies a status change of the first digital article carrier by a change in the piece of status information between two queries. This means that an active determining of a piece of status change information on the part of the digital article carrier is not required in this embodiment. Instead, the active identifying of a status change is done in the second digital article carrier. Both are preferably done in that the inquiring unit and/or the inquiring party (e.g. a digital article carrier or a digital means for influencing the article conveyance) reads out the data. This means that the first digital article carrier preferably reads out the piece of status information of the assigned first real article carrier and also the second digital article carrier preferably reads out the piece of status information of the first digital article carrier. An active response by the inquired unit/by the inquired party is not required in this case. Furthermore, the first real article carrier need not send any report to the first digital article carrier, and also the first digital article carrier need not send any report to the second digital article carrier. The distribution of the piece of status information inside the system presented is therefore done in accordance with a uniform principle. Here, it is also particularly advantageous that the control of the first real article carrier need not be recoded, or need be only slightly recoded, to that end. The proposed embodiment variant is therefore in particular suited for applications in heterogeneous systems, for example in systems with real article carriers of different manufacturers which are each based on proprietary control software.

It is furthermore advantageous if, in case b), the first digital article carrier reports to the second digital article carrier merely the presence (and/or the existence) of the status change, or a restricted piece of status change information, in a first step and provisions a comprehensive and/or more extensive piece of status change information to the second digital article carrier in a subsequent second step, in particular after a corresponding inquiry (request) by the second digital article carrier. This procedure is of advantage whenever the quantity of data that is distributed inside the system is to be reduced, as only those recipients receive a (comprehensive/extensive) piece of status change information that have actively requested it. The report on the presence of a status change, or on a restricted piece of status change information, in contrast, can be done in very short form. For example, the restricted piece of status change information can specify the kind of status change information. For example, the restricted piece of status change information can therefore be "position update" if the status change relates to a change in the position of the first real article carrier or "battery status update" if the status change relates to a change of the state of charge of the battery of the first real article carrier. Evidently, also abbreviated symbols can be used to that end, for example "PA" for the position update and "BA" for the update of the battery status. The comprehensive/extensive piece of status change information can be, for example, "battery status changed to 85%." The comprehensive/extensive piece of status change information therefore offers more information than the restricted piece of status change information.

In this context, it is also of advantage if the second digital article carrier, after receiving the report on the presence of the status change, or after obtaining the restricted piece of status change information, sends an inquiry (request), including an additional piece of inquiry information, to the first digital article carrier, as to which comprehensive and/or more extensive pieces of status information and/or as to which comprehensive pieces of status change information are to be provisioned by the first digital article carrier. For example, a position and alignment sensor can determine the position and alignment and/or orientation of the real article carrier, yet whereas possibly only the position is of interest to the second article carrier. Therefore, the second digital article carrier, if it has been informed of the existence of a status change, can specify by the additional piece of inquiry information which piece of information (here, for example, the position) is of interest to it. In another step, the first digital article carrier therefore provisions the position of the first real article carrier but not its orientation. In this way, the quantity of data that is distributed inside the system can be reduced further. Evidently, the pieces of status change information can also relate to signals of multiple different sensors. It is also conceivable that pieces of status information and/or pieces of status change information in which no change at all occurred are inquired by the additional piece of inquiry information. For example, it would be possible that the status change relates to the state of charge of a battery of the first real article carrier. As this is not relevant for the second article carrier in this example, the first digital article carrier will not provision any pieces of status information and/or pieces of status change information to the second digital article carrier. Yet the sending of a (blank) confirmation can be provided. It is also conceivable that the second digital article carrier does not respond to the reporting of a present status change, in particular if it is apparent to the second digital article carrier from a restricted piece of status change information that the status change is not of interest to it.

It is also advantageous if a digital means for influencing the article conveyance, which corresponds to a digital model of a real means for influencing the article conveyance, is generated in the digital storage and conveying region, wherein the digital means for influencing the article conveyance is equally stored in the computer and wherein the real means for influencing the article conveyance is configured to influence the conveyance of the articles in the picking system but does not comprise an article reception, and wherein an identification of a status change of the real means for influencing the article conveyance and an exchange of information between a means for influencing the article conveyance and an article carrier is done in the same manner as between two article carriers. An example of such a "means for influencing the article conveyance" is, for example, a door or a gate, which, when closed, blocks the way for the autonomous conveying vehicle(s) and, when open, enables the passing of the autonomous conveying vehicle(s). A sensor for a door that comes into consideration is in particular, for example, an open/close contact which specifies whether the door is open or closed. The use of a rotary encoder in order to be able to evaluate the angular position of a (rotatably mounted) door leaf would also be conceivable. If the door is a sliding door, a linear measurement means can provide information on the position of the door leaf. In particular, position and/or alignment of the real means for influencing the article conveyance are continuously matched against and/or synchronized with the position and/or alignment of the digital means for influencing the article conveyance. A change in position and/or alignment of the real means for influencing the article conveyance will result in a corresponding change in position and/or alignment of the digital means for influencing the article conveyance, and vice versa. Also here, the synchronization can comprise also other statuses of the means for influencing the article conveyance.

Other examples of means for influencing the article conveyance are barrier tapes or barrier means, boom barriers, traffic lights, traffic signs, traffic cones, rerouting signs, warning signs, as well as information signs. In particular, these means can also be only temporarily installed in the storage and conveying region in order to indicate, for example, cleaning or maintenance work, such as, for example, dirt in the conveying region. For example, the autonomous guided vehicles, as a rule, cannot directly identify spilled oil on the travel surface, but they can do so using the signage (put in place by the operating personnel). For example, rerouting signs or barriers can be designed such that their purpose is immediately apparent to parties (in particular to humans) in the real world on the basis of the optical design. For example, a rerouting sign immediately shows a provided detour direction. This purpose inherent in the rerouting sign can be transferred into the digital world by determining the position and orientation of the rerouting sign by a sensor and generating and storing it in the digital storage and conveying region. This ensures that the rerouting sign also has an effect on the digital article carriers.

It is generally also conceivable that means for influencing the article conveyance are only installed in the digital storage and conveying region and have an effect on the digital article carriers. Purely digital means for influencing the article conveyance, while not being directly apparent in the real storage and conveying region, also have an effect there, since the movements of the real and digital article carriers are synchronized. Yet it would be conceivable that purely digital means for influencing the article conveyance are displayed to a person using extended reality ("augmented reality"), for example via a set of data goggles.

This, therefore, results in the following specific advantageous embodiment variants for the means for influencing the article conveyance:

It is favorable if a piece of status information relating to a physical status of the real means for influencing the article conveyance is detected and provisioned using at least one sensor and/or a piece of status information relating to a status of a control program for the real means for influencing the article conveyance is provisioned by the control program, wherein the control program runs in a control of the real means for influencing the article conveyance, and the digital means for influencing the article conveyance, which is assigned to the real means for influencing the article conveyance, obtains pieces of status information of this real means for influencing the article conveyance provisioned at different points in time, or a piece of status change information describing a change in the provisioned pieces of status information of this real means for influencing the article conveyance, and provisions these pieces of status information, or this piece of status change information, or a piece of status change information derived from the pieces of status information, to a second digital article carrier of the digital article carriers.

It is also favorable if i) the digital means for influencing the article conveyance repeatedly obtains the provisioned piece of status information of the assigned real means for influencing the article conveyance and provisions this piece of status information to the second digital article carrier of the digital article carriers and if the second digital article carrier repeatedly obtains the status information provisioned by the digital means for influencing the article conveyance and identifies a status change of the real means for influencing the article conveyance by a change in the piece of status information between two points in time, or ii) the digital means for influencing the article conveyance repeatedly obtains the provisioned piece of status information of the assigned real means for influencing the article conveyance, derives an assigned piece of status change information therefrom, and provisions this piece of status change information to the second digital article carrier of the digital article carriers, or iii) the digital means for influencing the article conveyance obtains the piece of status change information, which describes a change in the provisioned pieces of status information of this real means for influencing the article conveyance, and provisions this piece of status change information to the second digital article carrier of the digital article carriers.

It is further favorable if the real means for influencing the article conveyance transmits the piece of status information to the digital means for influencing the article conveyance at different points in time and the digital means for influencing the article conveyance receives this piece of status information, or the real means for influencing the article conveyance deposits the piece of status information at different points in time and the digital means for influencing the article conveyance determines this piece of status information, or the real means for influencing the article conveyance transmits the piece of status change information to the digital means for influencing the article conveyance and the digital means for influencing the article conveyance receives this piece of status change information, or the real means for influencing the article conveyance deposits the piece of status change information and the digital means for influencing the article conveyance determines this piece of status change information.

It is furthermore favorable if the digital means for influencing the article conveyance transmits the piece of status information to the second digital article carrier at different points in time and the second digital article carrier receives this piece of status information, or

the digital means for influencing the article conveyance deposits the piece of status information at different points in time and the second digital article carrier determines this piece of status information, or the digital means for influencing the article conveyance transmits the piece of status change information to the second digital article carrier and the second digital article carrier receives this piece of status change information, or the digital means for influencing the article conveyance deposits the piece of status change information and the second digital article carrier determines this piece of status change information.

It is additionally advantageous if the digital means for influencing the article conveyance, in case ii), derives a piece of status change information and provisions this piece of status change information to the second digital article carrier of the digital article carriers only as and when the digital means for influencing the article conveyance identifies a status change of the real means for influencing the article conveyance by a change in the piece of status information between two points in time.

It is also favorable if the status change of the real means for influencing the article conveyance is reported to the second real article carrier by the second digital article carrier, which is assigned to the second real article carrier.

It is further favorable if the digital means for influencing the article conveyance repeatedly determines the piece of status information of the assigned real means for influencing the article conveyance and identifies a status change of the real means for influencing the article conveyance by a change in the piece of status information between two queries.

It is additionally favorable if, in case ii), the digital means for influencing the article conveyance reports to the digital article carrier merely the presence of the status change, or a restricted piece of status change information, in a first step and the second digital article carrier provisions a comprehensive and/or more extensive piece of status change information in a subsequent second step, in particular after a corresponding inquiry by the second digital article carrier.

It is finally favorable if the second digital article carrier, after receiving the report on the presence of the status change, or after obtaining the restricted piece of status change information, sends an inquiry, including an additional piece of inquiry information to the digital means for influencing the article conveyance, as to which comprehensive/extensive pieces of status information and/or as to which comprehensive/extensive pieces of status change information are to be transmitted, or provisioned, by the digital means for influencing the article conveyance.

It should be noted in this context that the advantages and embodiment variants disclosed above in relation to the exchange of information between two article carriers can also be analogously applied to the exchange of information between a means for influencing the article conveyance to an article carrier.

It should further be noted that the variants and advantages disclosed in relation to the method presented equally relate to the picking system presented, and vice versa.

BRIEF DESCRIPTION OF THE DRAWINGS

For the purpose of better understanding of the invention, it will be elucidated in more detail by the figures below. These show in a respectively very simplified schematic representation.

DETAILED DESCRIPTION OF THE
PREFERRED EMBODIMENTS

First of all, it is to be noted that, in the different embodiments described, equal parts are provided with equal reference numbers and/or equal component designations, where the disclosures filled into in the entire description may be analogously transferred to equal parts with equal reference numbers and/or equal component designations. Moreover, the specifications of location, such as at the top, at the bottom, at the side, chosen in the description refer to the directly described and depicted figure, and in case of a change of position, are to be analogously transferred to the new position.

Figure 1:
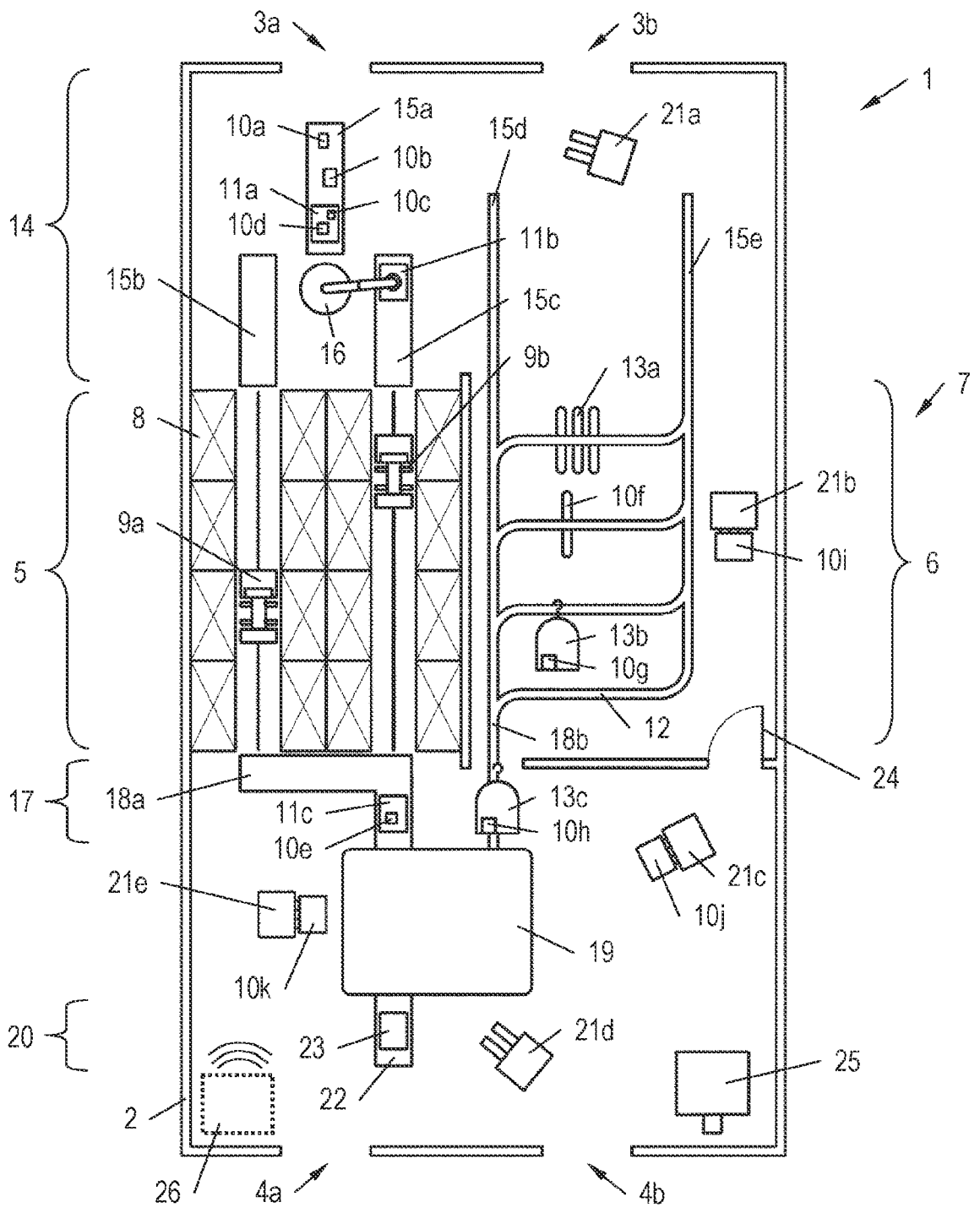
FIG. 1 a picking system in a top view.

FIG. 1 shows an exemplary picking system 1, which comprises a building 2 which has article receiving areas 3a and 3b, as well as article issue areas 4a and 4b. The picking system 1 further comprises a first storage region 5 and a second storage region 6, which, jointly, form part of the article storage 7.

The first storage region 5 comprises storage racks 8, as well as storage and retrieval units 9a and 9b traveling between the storage racks 8. Articles 10a . . . 10e can be stored in the storage racks 8 directly or using first transport loading aids 11a . . . 11c. In this case, the first transport loading aids 11a . . . 11c can in particular be configured as trays or containers with a fixed base and side walls.

The second storage region 6 comprises overhead storage conveyors 12, on which articles 10f . . . 10h can be stored directly or using second transport loading aids 13a . . . 13c, in this case using hanging bags 13a . . . 13c. If the articles 10f are stored directly on the overhead storage conveyors 12, the articles 10f have the form of hanging articles, i.e. for example the form of items of clothing, which hang on clothes hooks. If the articles 10g . . . 10h are stored in the hanging bags 13a . . . 13c, they can have practically any form.

The picking system 1 further comprises a storage conveying system 14, which, in this example, has a first storage section 15a, a second storage section 15b and a third storage section 15c. The first storage section 15a connects the article receiving area 3a with a rearranging robot 16. The second storage section 15b and the third storage section 15c connect the rearranging robot 16 with the storage and retrieval units 9a and 9b. On the first storage section 15a, two articles 10a, 10b are transported without first transport loading aids 11a . . . 11c; two further articles 10c, 10d are transported with a first transport loading aid 11a.

At the end of the rack aisles which faces the storage conveying system 14, a retrieval conveying system 17 is provided, which, in this example, has a first retrieval section 18a which connects the storage and retrieval units 9a and 9b with a picking station 19.

The storage conveying system 14 further comprises a fourth storage section 15d and a fifth storage section 15e which connect the article receiving area 3b with the second storage region 6.

At the end of the second storage region 6 which faces the storage conveying system 14, the retrieval conveying system 17 comprises a second retrieval section 18b which connects the overhead storage conveyors 12 with the picking station 19.

The picking system 1 also comprises an article issue conveying system 20, which connects the picking station 19 with the article issue areas 4a and 4b. In the example shown, the article issue conveying system 20 comprises an article issue section 22, on which a shipping package (a target loading aid) 23 is transported.

Finally, the picking system 1 has some autonomous guided vehicles 21a . . . 21e, which can transport articles 10i . . . 10k from the article receiving area 3a to the storage and retrieval units 9a and 9b, or articles 10i . . . 10k from the the article receiving area 3b to the fourth storage section 15d or fifth storage section 15e, and therefore form a part of the storage conveying system 14, and/or can transport articles 10i . . . 10k from the storage and retrieval units 9a and 9b to the picking station 19, or articles 10i . . . 10k from the second retrieval section 18b to the picking station 19, and therefore form a part of the retrieval conveying system 17, and/or can transport articles 10i . . . 10k from the article receiving area 3a or 3b to the picking station 19 and therefore form both a part of the storage conveying system 14 and of the retrieval conveying system 17 (transport of cross-docking articles), and/or can transport shipping packages 23 from the picking station 19 to the article issue area 4a, 4b and therefore form a part of the article issue conveying system 20.

It is also conceivable that the picking system 1 comprises a rearranging conveying system (not represented in FIG. 1) between the first storage region 5 and the second storage region 6, using which rearranging conveying system articles 10a . . . 10k can be rearranged between the two storage regions 5 and 6. In particular, articles 10a . . . 10k can be removed from a first transport loading aid 11a . . . 11c, for example a container, and reloaded into a second transport loading aid 13a . . . 13c, preferably a hanging bag, or vice versa. The rearranging conveying system can comprise stationary conveying devices and/or autonomous guided vehicles 21a . . . 21e.

The picking system 1 represented in FIG. 1 further comprises a door 24, as well as a lift 25. Here, the door 24 forms a means for influencing the article conveyance.

Finally, a computer 26 is represented in FIG. 1 by way of example, which computer 26 can communicate with means of the picking system 1, in particular with article carriers and/or means for influencing the article conveyance, and can control them. Specifically, the computer 26 can communicate with and control in particular the storage and retrieval units 9a, 9b, the storage conveying system 14, the rearranging robot 16, the retrieval conveying system 17, the picking station 19, the article issue conveying system 20, the autonomous guided vehicles 21, 21a . . . 21e and the lift 25, which are therefore part of the means of the picking system 1. For the sake of simplicity, a wireless communication is indicated in FIG. 1 to that end, yet a wired communication is also conceivable, of course. Also the virtualization of the picking system 1 is done in the computer 26 (in this context, see also FIGS. 3 to 5). Evidently, the control and communication, as well as the virtualization, are not bound to a specific, physical computer 26, but the computer 26 can symbolically also represent a computer cluster or a computer network, which can in particular also comprise cloud solutions.

The functioning of the storage and order-picking system 1 represented in FIG. 1 is as follows:

At the article receiving area(s) 3a and/or 3b, articles 10a . . . 10b are delivered and stored in the first storage region 5 and/or the second storage region 6. For storing in the first goods region 5, the articles 10a and 10b are placed directly onto the first storage section 15a of the storage conveying system 14, and/or articles 10c and 10d are placed onto the first storage section 15a using a first transport loading aid 11a. The articles 10a . . . 10d are subsequently transported to the rearranging robot 16 and placed, by same, onto the second storage section 15b or onto the third storage section 15c. In a further step, the articles 10a . . . 10d are transported to the storage and retrieval units 9a and 9b using the storage conveying system 14 and stored in the storage racks 8 using storage and retrieval units 9a and 9b.

When executing an order for picking articles, the assigned article(s) 10e is/are retrieved from the storage rack 8 using the storage and retrieval unit 9a or 9b, handed over to the retrieval section 18a of the retrieval conveying system 17 and transported to the picking station 19 on the retrieval section 18a.

In the picking station 19, the article(s) 10e is/are handed over/packed into in a shipping package 23, and the shipping package 23 is subsequently transported to the article issue area 4a via the article issue section 22 of the article issue conveying system 20.

The procedure for storing, maintaining in storage, retrieving and picking articles 10f . . . 10h is similar to that for storing, maintaining in storage, retrieving and picking articles 10a . . . 10e.

(An) article(s) 10f can be transported, via the fourth storage section 15d or the fifth storage section 15e, onto one of the overhead storage conveyors 12 of the second storage region 6 and stored there. In this case, the article(s) 10f can be transported on the overhead conveyors of the fourth storage section 15d or of the fifth storage section 15e and/or stored on the overhead storage conveyor 12 directly or using a second transport loading aid 13a . . . 13c, such as this is represented in FIG. 1 for the articles 10g and 10h. In this example, the second transport loading aid 13a . . . 13c is configured as a hanging bag.

It should be noted in this context that the hanging bags 13b and 13c in FIG. 1 have been rotated into the plane of projection for the sake of better representability. In reality, the hanging bags 13b and 13c hang downward, of course.

When executing an order for picking articles, the assigned article(s) 10h and/or the hanging bag 13c is/are transported to the picking station 19 via the second retrieval section 18b of the retrieval conveying system 17. In the picking station 19, the article(s) 10h is/are handed over/packed into a shipping package 23. Subsequently, the shipping package 23 is transported to the article issue area 4a via the article issue section 22 of the article issue conveying system 20 again.

The transport of the articles 10a . . . 10h can be done via the conveying system with stationary conveying devices, such as this has been described above, or using autonomous guided vehicles 21a . . . 21e, such as this is represented in FIG. 1. For example, (an) article(s) 10f . . . 10h can be transported from the article receiving area 3b to the fourth storage section 15*d* or the fifth storage section 15*e* using an autonomous guided vehicle 21*a*. (An) article(s) 10*k* can also be transported from the first storage region 5 or from the second storage region 6 to the picking station 19 using an autonomous guided vehicle 21*e*. It would also be conceivable that (an) article(s) 10*i* is/are transported directly from the article receiving area 3*a* or 3*b* to the picking station 19 with an autonomous guided vehicle 21*b* (cross-docking article(s)). Finally, it is also conceivable that a shipping package 23 is transported from the picking station 19 to the article issue area 4*a* or 4*b* by a guided vehicle 21*d*. The articles 10*i* . . . 10*k* can be transported by the guided vehicles 21*a* . . . 21*e* without first transport loading aids 11*a* . . . 11*c* or without second transport loading aids 13*a* . . . 13*c*, as specified above, or also be transported with first transport loading aids 11*a* . . . 11*c* or with second transport loading aids 13*a* . . . 13*c*.

Using the door 24, one region of the picking system 1 can be separated from another. Using the lifts 25, articles 10*a* . . . 10*k* can be transported from one level of the picking system 1 to another level of the picking system 1 with or without first transport loading aids 11*a* . . . 11*c* or second transport loading aids 13*a* . . . 13*c*. Additionally or alternatively, the autonomous guided vehicles 21*a* . . . 21*e* can be transported from one level of the picking system 1 to another level of the picking system 1.

The procedures described are controlled by the computer 26 and run automatically. Articles 10*a* . . . 10*k* can also be transported manually in the picking system 1, for example articles 10*a* . . . 10*k* can be carried by a person, with a pallet truck or using the help of a manned forklift, for example. Persons can be located in the picking system 1 also for other purposes, for example for repair or cleaning work.

Figure 2:
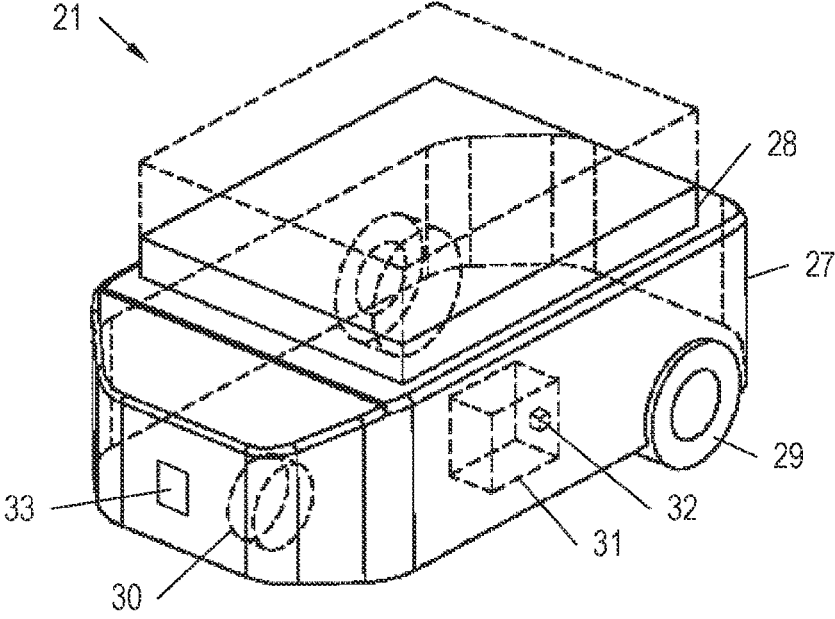
FIG. 2 an example of an autonomous guided vehicle.

FIG. 2 shows a possible embodiment of an autonomous guided vehicle 21 ("automated guided vehicle," "AGV" in short, or "automated mobile robot," "AMR" in short). The autonomous guided vehicle 21 comprises a chassis 27 with a drive unit and, arranged on the chassis 27, an article reception or loading platform 28 for receiving, dispensing and transporting (an) article(s) 10*a* . . . 10*k* (not represented in this Fig.) or a first transport loading aid 11*a* . . . 11*c* (not represented in this Fig.). It would also be conceivable that the autonomous guided vehicle 21 additionally or alternatively comprises a hanger rod acting as article reception, with which hanging bags 13*a* . . . 13*c*, or hanging articles on article transport carriers with coat hangers, or coat hangers with the hanging articles, can be transported.

The drive unit comprises wheels 29, 30 mounted on the chassis 27 so as to be rotatable, at least one of which wheels 29 is coupled with a drive (not represented), and at least one of which wheels 30 is steerable. It is also possible for both wheels 29 to be coupled with the drive and driven by same. Yet the autonomous guided vehicle 21 may also comprise four wheels, two of which wheels are steerable. According to the embodiment shown, the article reception 28 is mounted on the chassis 27 so as to be adjustable between an initial position (marked by solid lines) and a transport position (marked by dashed lines).

In the initial position, (an) article(s) 10*a* . . . 10*k*, or a first transport loading aid 11*a* . . . 11*c*, can be traveled underneath in order to receive same. If the article reception 28 is adjusted from the initial position in a direction of the transport position, the article(s) 10*a* . . . 10*k*, or the first transport loading aid 11*a* . . . 11*c*, can be lifted and subsequently transported. If the article reception 28 is readjusted from the transport position in a direction of the initial position, the article(s) 10*a* . . . 10*k*, or the first transport loading aid 11*a* . . . 11*c*, can be deposited, or dispensed, again.

The autonomous guided vehicle 21 further comprises a control 31, schematically represented by dashed lines, for controlling/regulating the movements of the autonomous guided vehicle 21. The control 31 can also comprise means for the (wireless) data transfer to and from the autonomous guided vehicle 21. In this way, the autonomous guided vehicle 21 and/or its control 31 can communicate with the superordinate computer 26, i.e. receive commands from same and transmit data to same.

Finally, the autonomous guided vehicle 21 comprises sensors for detecting the surroundings of the autonomous guided vehicle 21 and for spatial orientation. In this example, the autonomous guided vehicle 21 comprises, in a purely illustrative manner, a position and alignment sensor 32 arranged in the control 31, as well as an ultrasonic sensor 33 connected to the control 31. Using the position and alignment sensor 32, the control 31 can determine the position and alignment and/or orientation of the autonomous guided vehicle 21. Using the ultrasonic sensor 33, obstacles in the travel path of the autonomous guided vehicle 21 can be identified. Further, the control 31 is connected to the drive and the steering system of the autonomous guided vehicle 21.

The method presented uses a digital (and/or virtual) storage and conveying region, which corresponds to a digital, two or three-dimensional model of a real (physical) storage and conveying region of the picking system 1. In FIG. 1, the storage and conveying region comprises practically the entire picking system 1. Yet this need not be the case if the picking system 1 (as is common in reality) also comprises office spaces, sanitary facilities, break rooms, rooms with operational plants (e.g. rooms with electric switch cabinets, air conditioning units, compressors and suchlike). Spaces that are not intended for storing and/or conveying (an) article(s) 10*a* . . . 10*k*, are not counted among the storage and conveying region.

The method presented further uses digital (and/or virtual) article carriers, which correspond to digital article carrier models of the real (physical) article carriers, in the digital storage and conveying region.

The term article carrier is to be understood broadly and comprises all means of the picking system 1 which have an article reception 28 for the intended storage and/or conveyance of at least one article 10*a* . . . 10*k* each in the picking system 1. In particular, this includes one or multiple of the means specified below:

the storage racks 8,
the storage and retrieval units 9*a*, 9*b*,
the first transport loading aids 11*a* . . . 11*c*,
the overhead storage conveyors 12,
the second transport loading aids 13*a* . . . 13*c*,
the storage conveying system 14, in particular with the storage sections 15*a* . . . 15*e*,
the rearranging robot 16,
the retrieval conveying system 17, in particular with the retrieval section 18*a*,
the picking station 19,
the article issue conveying system 20/the article issue section 22,
the autonomous guided vehicles 21, 21*a* . . . 21*e*,
the target loading aid 23,
the lift 25.

In a first step, the digital storage and conveying region is generated and stored in the computer 26. In another step, digital article carriers are generated and stored in the computer 26. Here, the digital article carriers are located in the virtual storage and conveying region, in a "virtual world," as it were. The virtual storage and conveying region can comprise all article carriers located in the real storage and conveying region. Yet this is not an imperative condition, and the virtual storage and conveying region can also comprise only some of the article carriers located in the real storage and conveying region.

Figure 3:
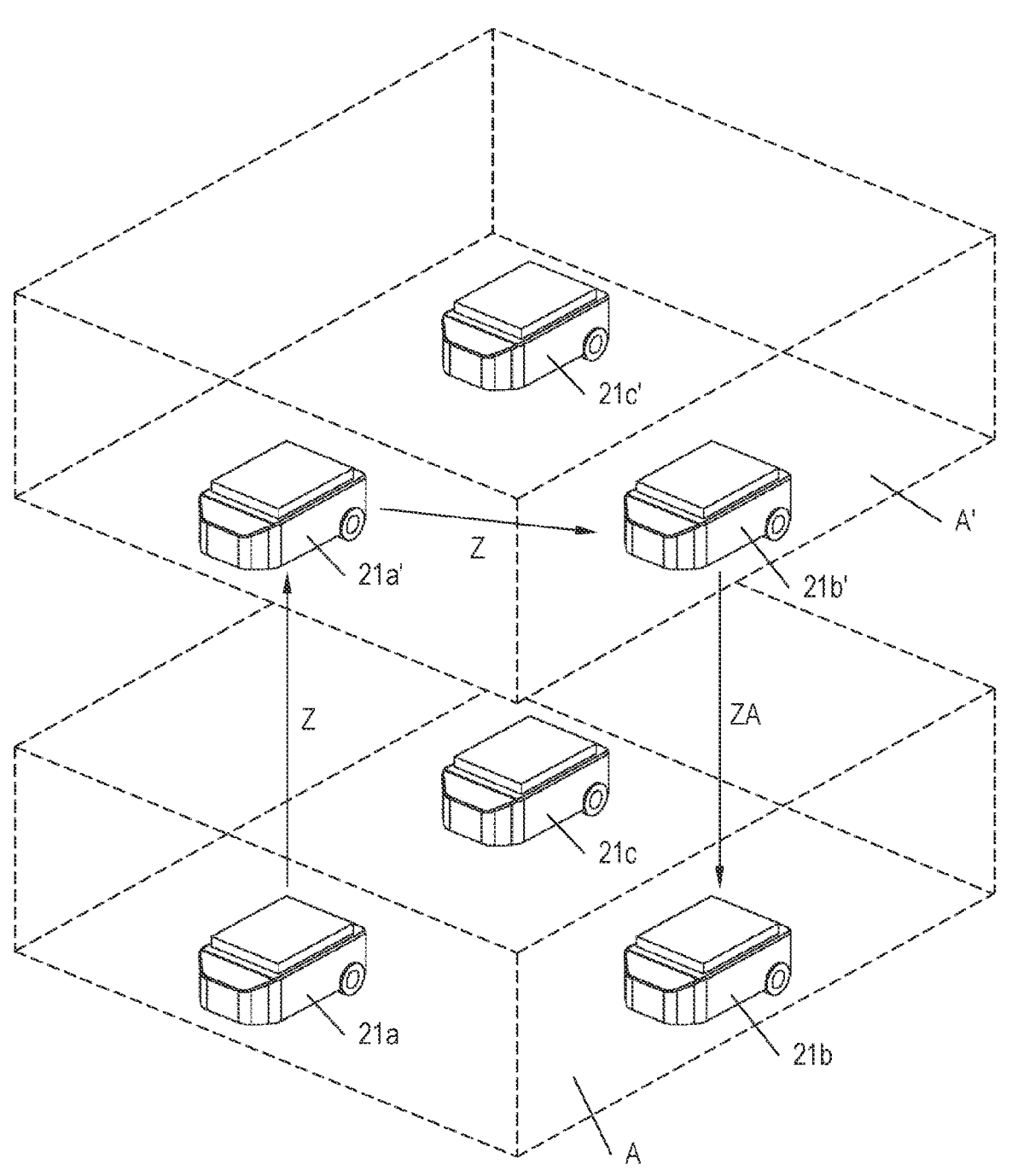
FIG. 3 an example of the provisioning of a piece of status information in a picking system.

In FIG. 3, this digital image of the real world is represented by the autonomous guided vehicles 21*a* . . . 21*c*, which serve as illustrative examples of article carriers. Yet the procedure presented below can also be applied to other kinds of article carriers, in particular to the kinds of article carriers listed above.

In the lower region of FIG. 3, the real storage and conveying region A with the real autonomous guided vehicles 21*a* . . . 21*c* is represented, in the upper region the digital storage and conveying region A' with the digital autonomous guided vehicles 21*a*'. . . 21*c*' is represented. In the lower region of FIG. 3, therefore, the real world is represented, in the upper region the digital model, or image thereof, existing in the computer 26, is represented. In this context, the terms "virtualization" and "digital twins" are also used.

The disclosed method is concerned with the detecting of a piece of status information relating to an article carrier and the distributing of a piece of information of a status change of a first real article carrier in the system. In FIGS. 3 to 7, this is represented using the example of the autonomous guided vehicle 21*a*.

In the example represented in FIG. 3 for a case a), the first digital article carrier 21*a*' (here the digital autonomous guided vehicle 21*a*') obtains the provisioned piece of status information Z of the assigned first real article carrier 21*a* (here the real autonomous guided vehicle 21*a*) at multiple points in time, i.e. repeatedly. The first digital article carrier 21*a*' provisions the piece of status information Z to the second digital article carrier 21*b*' (here the digital autonomous guided vehicle 21*b*'), and the second digital article carrier 21*b*' obtains the status information Z provisioned by the first digital article carrier 21*a*' at multiple points in time again, i.e. equally repeatedly. In addition, the second digital article carrier 21*b*' identifies a status change of the first real article carrier 21*a* by a change in the piece of status information between two points in time.

Figure 4:
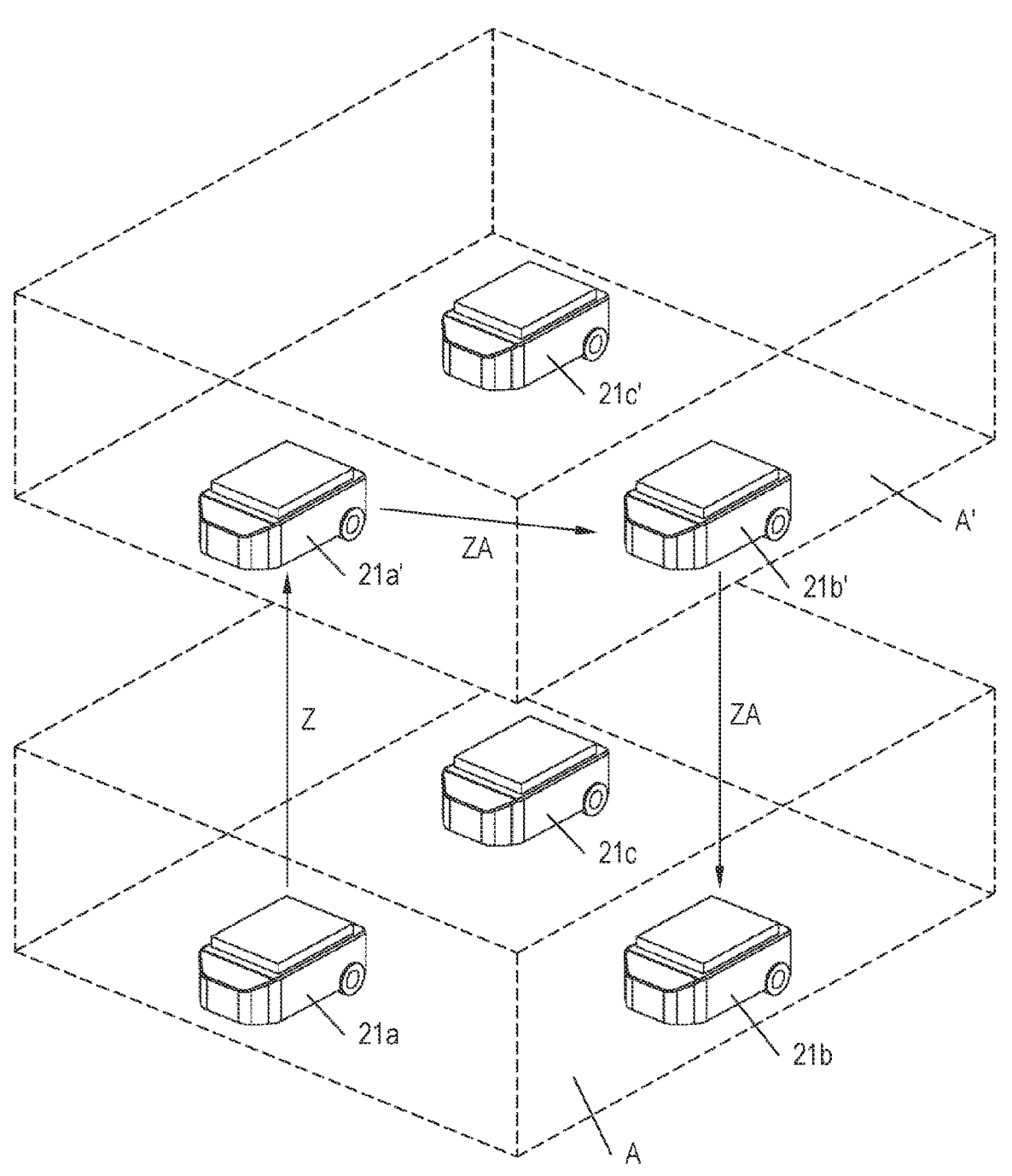
FIG. 4 an example of the provisioning of a piece of status change information in a picking system.

FIG. 4 shows a case b), which is somewhat modified in comparison to case a). In the example represented in FIG. 4, the first digital article carrier 21*a*' obtains the provisioned piece of status information Z of the assigned first real article carrier 21*a* at multiple points in time, i.e. repeatedly, again. Contrary to case a), the first digital article carrier 21*a*' derives an assigned piece of status change information ZA therefrom and provisions this piece of status change information ZA to the second digital article carrier 21*b*'.

Figure 5:
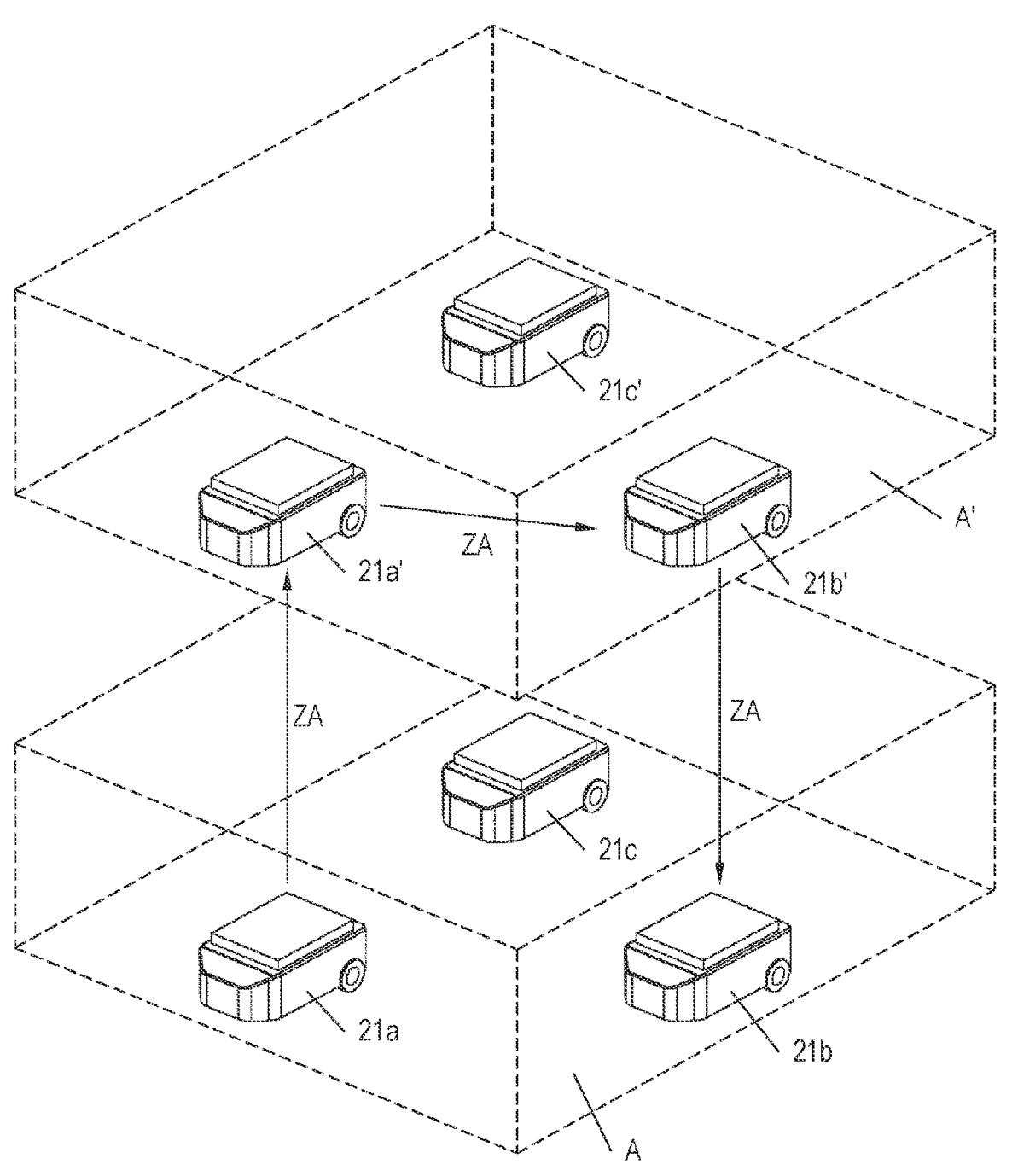
FIG. 5 another example of the provisioning of a piece of status change information in a picking system.

FIG. 5 shows a case c), which is somewhat modified in comparison to case b). In the example represented in FIG. 5, the piece of status change information ZA is provisioned directly by the first real article carrier 21*a*. The digital article carrier 21*a*' provisions the piece of status change information ZA, which describes a change in the provisioned pieces of status information of this first real article carrier (21*a*), to the second digital article carrier 21*b*'.

In another optional step, the piece of status change information ZA, which describes a status change of the first real article carrier (here of the real autonomous guided vehicle 21*a*), in the cases a) to c) as illustrated in FIGS. 3 to

5, can be reported to the second real article carrier of the real article carriers (here the real autonomous guided vehicle 21*b*) by the second digital article carrier (here the digital autonomous guided vehicle 21*b*'), which is assigned to the second real article carrier of the real article carriers.

Generally, the detected status change can relate to a change in a physical status of the first real article carrier (here the real autonomous guided vehicle 21*a*), which is detected with a sensor. This can be a sensor on the autonomous guided vehicle 21*a* itself, for example the position and alignment sensor 32, or the ultrasonic sensor 33 of the autonomous guided vehicle 21*a*. Accordingly, the physical status of the autonomous guided vehicle 21*a* can be a position and alignment of same. Yet the physical status of the autonomous guided vehicle 21*a* can also be the distance to and the direction towards an obstacle situated in the travel path. A status change is therefore, for example, a change in position and alignment of the autonomous guided vehicle 21*a* or a change in distance to and direction towards an obstacle situated in the travel path.

The detection of the status and/or of a status change is in no way bound to being detected with a sensor 32, 33 which is arranged on or in the autonomous guided vehicle 21*a*. Rather, also the detection with external sensors is conceivable. For example, cameras arranged in the (real) picking system 1 can serve to acquire, for example, position and alignment of the autonomous guided vehicle 21*a*, or distance to and direction towards an obstacle situated in the travel path.

In addition to the statuses and status changes which can be detected with a sensor, the detected status information can also relate to a status of a control program for the autonomous guided vehicle 21*a* that runs in the control 31. For example, it can be specified whether the guided vehicle 21*a* is currently in a start-up sequence (boot sequence), the control software is rendered up-to-date (updated) or the autonomous guided vehicle 21*a* is in normal operation. It can also be specified, for example, whether the autonomous guided vehicle 21*a* is currently executing a conveying order (transport order) for the conveyance of (an) article(s) 10*a* . . . 10*k* or is available for same.

Generally, it is conceivable that the first real article carrier 21*a* transmits the piece of status information Z to the first digital article carrier 21*a*' at different points in time and the first digital article carrier 21*a*' receives this piece of status information Z, or the first real article carrier 21*a* deposits the piece of status information Z at different points in time and the first digital article carrier 21*a*' determines this piece of status information Z, or the first real article carrier 21*a* transmits the piece of status change information ZA to the first digital article carrier 21*a*' and the first digital article carrier 21*a*' receives this piece of status change information ZA, or the first real article carrier 21*a* deposits the piece of status change information ZA and the first digital article carrier 21*a*' determines this piece of status change information ZA.

It is generally also conceivable that the first digital article carrier 21*a*' transmits the piece of status information Z to the second digital article carrier 21*b*' at different points in time and the second digital article carrier 21*b*' receives this piece of status information Z, or the first digital article carrier 21*a'* deposits the piece of status information Z at different points in time and the second digital article carrier 21*b'* determines this piece of status information, or the first digital article carrier 21*a'* transmits the piece of status change information ZA to the second digital article carrier 21*b'* and the second digital article carrier 21*b'* receives this piece of status change information ZA, or the first digital article carrier 21*a'* deposits the piece of status change information ZA and the second digital article carrier 21*b'* determines this piece of status change information ZA.

Here, the individual, above-mentioned possibilities can be combined as desired. For example, the first real article carrier 21*a* can deposit the piece of status information Z at different points in time and the first digital article carrier 21*a'* can determine this piece of status information Z, and the first digital article carrier 21*a'* can transmit the piece of status change information ZA to the second digital article carrier 21*b'*, and the second digital article carrier 21*b'* can receive this piece of status change information ZA.

It should also be noted that the piece of status information Z, or the piece of status change information ZA, as represented in FIGS. 3 to 5, can be passed on to one specific recipient only, or also to all, i.e. to all digital autonomous guided vehicles 21*b'*, 21*c'*.

Figure 6:
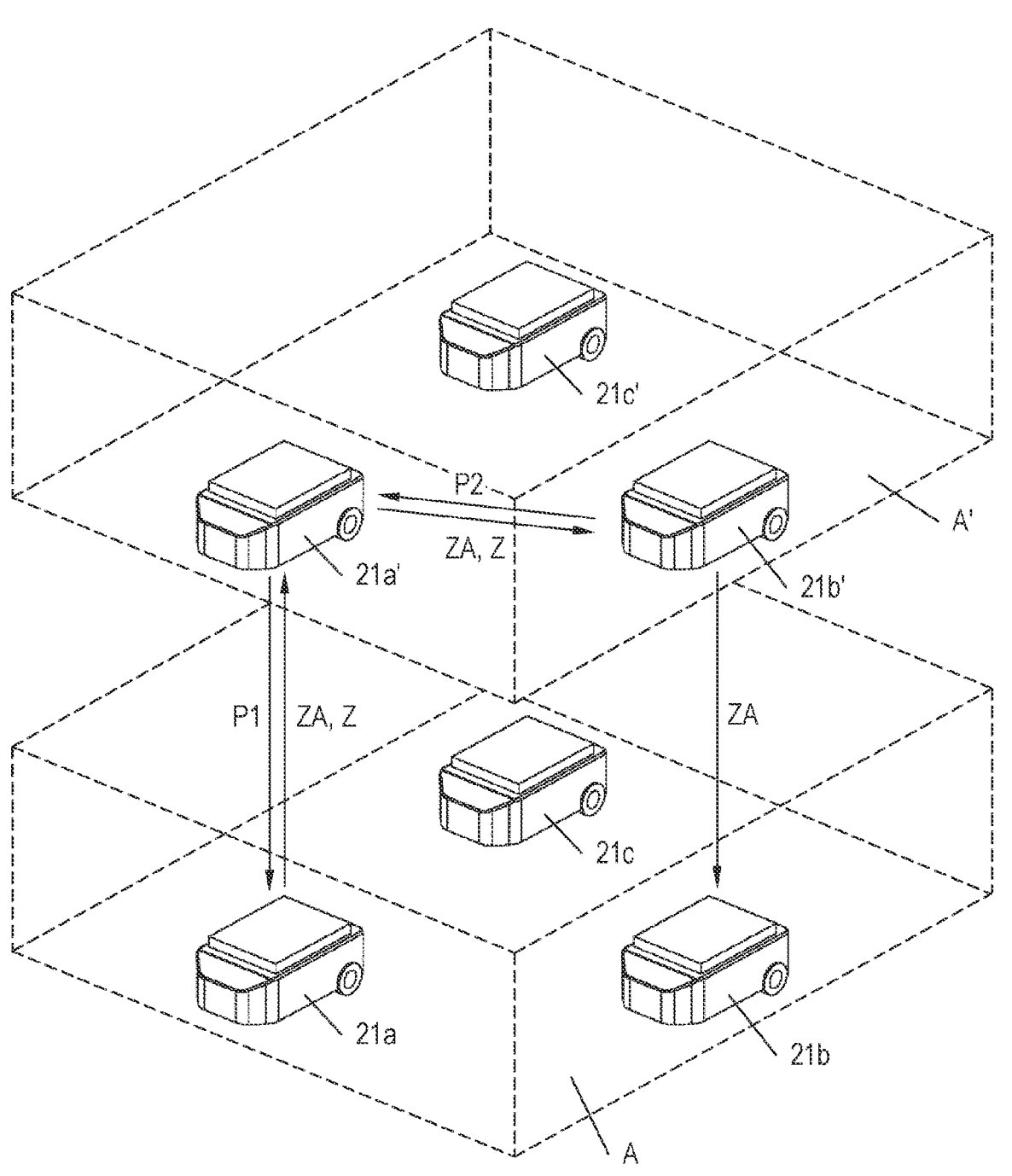
FIG. 6 an example of the active determining of a piece of status information, or of a piece of status change information, in a picking system.
Figure 7:
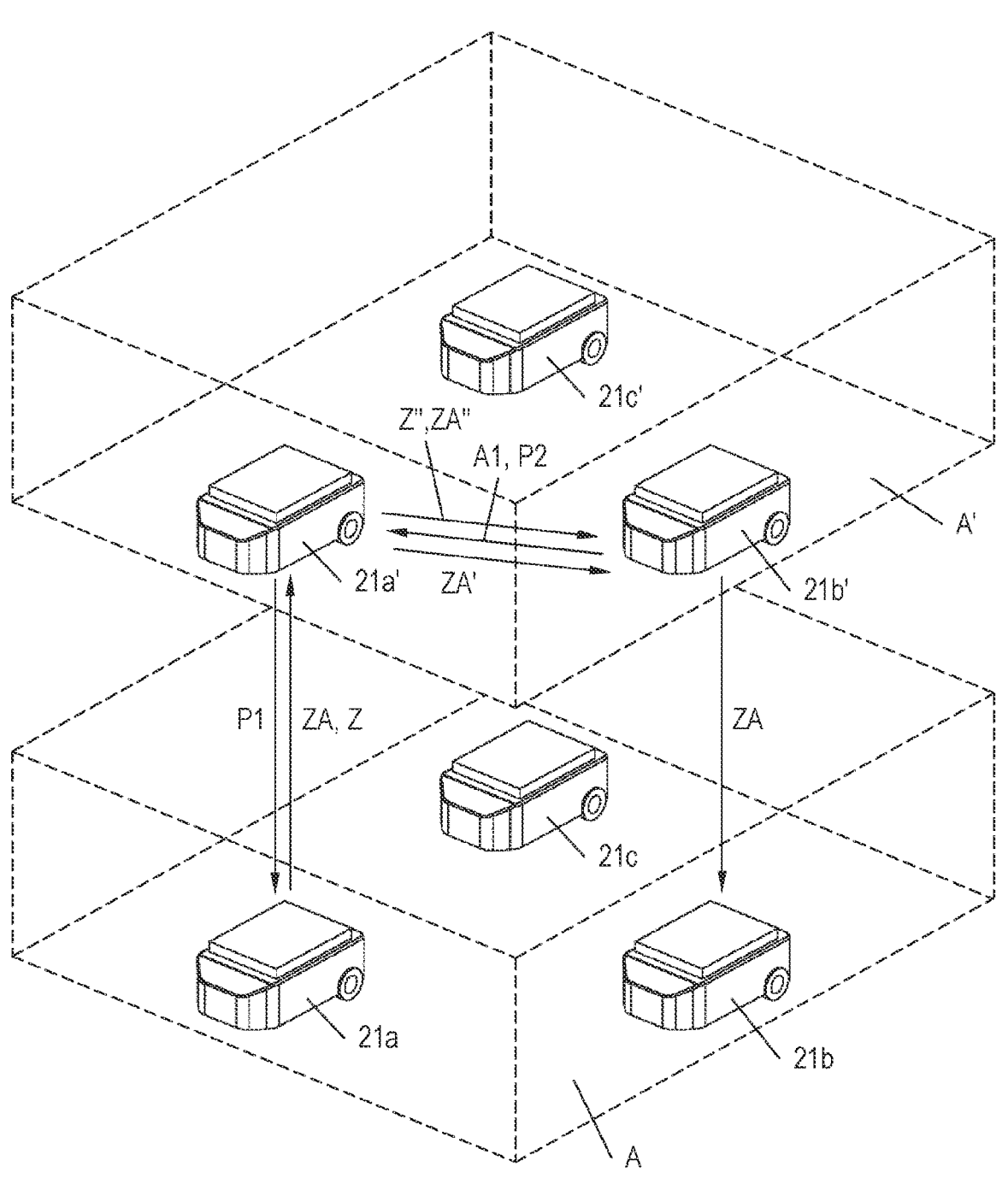
FIG. 7 an example of the reporting of a status change in the picking system.

Other specific examples are shown in FIGS. 6 and 7.

As represented already in FIG. 5, the real autonomous guided vehicle 21*a* itself can generate a piece of status change information ZA and provision same to the assigned digital autonomous guided vehicle 21*a'*. This assigned digital autonomous guided vehicle 21*a'* need then merely provision the piece of status change information ZA to the second digital article carrier 21*b'*. This procedure is symbolized in FIG. 6 with the arrow ZA again.

Yet it is also conceivable that the real autonomous guided vehicle 21*a* provisions merely a piece of status information Z to the digital autonomous guided vehicle 21*a'*, as this is already represented in FIGS. 3 and 4. Subsequently, the digital autonomous guided vehicle 21*a'* can identify a status change by a change in the piece of status information Z between two points in time, derive a piece of status change information ZA therefrom and provision it to the digital autonomous guided vehicle 21*b'*. Alternatively, the digital autonomous guided vehicle 21*a'* can provision pieces of status information Z to the digital autonomous guided vehicle 21*b'*.

Finally, it is also conceivable that the first digital article carrier (here the digital autonomous guided vehicle 21*a'*) repeatedly determines the piece of status information Z of the assigned first real article carrier (here of the real autonomous guided vehicle 21*a*) and identifies a status change of the first real article carrier by a change in the piece of status information between two queries. This means that an active sending of statuses, or status changes, on the part of the real autonomous guided vehicle 21*a* is not required in this embodiment. This procedure is symbolized in FIG. 6 with the arrow P1.

The determining of a piece of status information Z, or of a piece of status change information ZA, of the real autonomous guided vehicle 21*a* can therefore mean the reading out of a data set from a sensor 33, or from the control 31, of the real autonomous guided vehicle 21*a* or the receiving of a corresponding piece of status information Z, or piece of status change information ZA, from the real autonomous guided vehicle 21*a*. The piece of status information Z, or piece of status change information ZA, can be actively initiated by the real autonomous guided vehicle 21*a* or be based on an inquiry by the assigned digital autonomous guided vehicle 21*a'*.

It is also conceivable that the digital autonomous guided vehicle 21*b'* repeatedly determines the piece of status information Z, or piece of status change information ZA, of the digital autonomous guided vehicle 21*a'*. The determining can mean the reading out of a data set from the digital autonomous guided vehicle 21*a'* or the requesting of a corresponding provisioning by the digital autonomous guided vehicle 21*a'*. This procedure is symbolized in FIG. 6 with the arrow P2. It would also be conceivable that the digital autonomous guided vehicle 21*b'* picks up the piece of status change information ZA from a central reporting store, in which the digital autonomous guided vehicle 21*a'* deposits its pieces of status change information.

In another embodiment variant, represented in FIG. 7, the first digital article carrier (here the digital autonomous guided vehicle 21*a'*), in a first step, reports merely the presence and/or the existence of a status change, or a restricted piece of status change information ZA', to the second digital article carrier (here the digital autonomous guided vehicle 21*b'*). A specific and comprehensive piece of status change information ZA" is provisioned to the second digital article carrier 21*b'* in a subsequent second step.

In FIG. 7, the possible variants for the determining of a status change in this context are represented again, specifically:

the provisioning of a piece of status change information ZA by the real autonomous guided vehicle 21*a* for the assigned digital autonomous guided vehicle 21*a'*, the provisioning of a piece of status information Z by the real autonomous guided vehicle 21*a* for the assigned digital autonomous guided vehicle 21*a'*, and the determining of a piece of status information Z, or of a piece of status change information ZA, by the digital autonomous guided vehicle 21*a'* (see arrow P1).

Specifically, in the procedure represented in FIG. 7, the reporting of the presence and/or of the existence of a status change, or a restricted piece of status change information ZA', is done in a first step, thereafter the inquiry A1 and/or request of the second digital article carrier 21*b'* and finally the provisioning of a specific and comprehensive piece of status change information ZA" based on the inquiry A1. Subsequently, the piece of status change information ZA can again be reported to the second real article carrier (here to the real autonomous guided vehicle 21*b*) assigned to the second digital article carrier 21*b'*.

This procedure is of advantage whenever the quantity of data that is distributed inside the system is to be reduced, as only those recipients receive a comprehensive piece of status change information ZA" that have actively requested it. In this context, it is also of advantage if the second digital article carrier (here the digital autonomous guided vehicle 21*b'*), upon its inquiry A1 relating to the comprehensive piece of status change information ZA", sends an additional piece of inquiry information to the first digital article carrier (here the digital autonomous guided vehicle 21*a'*), which comprehensive pieces of status information Z" are to be provisioned from a plurality of pieces of status information Z by the first digital article carrier 21*a'* and/or which comprehensive pieces of status change information ZA" are to be provisioned from a plurality of pieces of status change information ZA by the first digital article carrier 21*a'*. For example, the position and alignment sensor 32 can determine the position and alignment and/or orientation of the autonomous guided vehicle 21*a*, yet possibly only the position is of interest to the second digital article carrier 21*b'* and/or to the second real article carrier 21*b*. Therefore, for example only the position of the autonomous guided vehicle 21*a* is transmitted with the comprehensive pieces of status information Z' and/or comprehensive pieces of status change information ZA'' but not its orientation. In this way, the quantity of data that is distributed inside the system can be reduced further.

Evidently, the comprehensive piece of status change information ZA'' can also relate to signals of multiple different sensors. It is also conceivable that comprehensive pieces of status information Z' and/or comprehensive pieces of status change information ZA'' in which no change at all occurred are inquired by the additional piece of inquiry information. For example, it would be possible that the status change relates to the state of charge of a battery of the first real article carrier 21*a*. As the state of charge is not relevant for the second digital article carrier 21*b'* and/or for the second real article carrier 21*b* in this example, the first digital article carrier 21*a'* will not transmit any comprehensive pieces of status information Z'' and/or comprehensive pieces of status change information ZA'' to the second digital article carrier 21*b'*. Yet the sending of a (blank) confirmation can be provided.

Generally, it is also sufficient if the comprehensive piece of status change information ZA'' is deposited, i.e. made available for reading out, for the second digital article carrier 21*b'* by the first digital article carrier 21*a'*. The active transmitting of the respective piece of information is not necessary in this case. This procedure is similar to the reading out of a data set from the digital autonomous guided vehicle 21*a'* by the digital autonomous guided vehicle 21*b'* designated with the arrow P2 in FIG. 6, but with the difference that the digital autonomous guided vehicle 21*b'* is made aware of the existence of a status change, or of a restricted piece of status change information ZA'. This ensures that any reading out of a data set from the digital autonomous guided vehicle 21*a'* that does not provide new insight to the digital autonomous guided vehicle 21*b'* is avoided.

It is in particular also advantageous if the first digital article carrier 21*a'* derives a piece of status change information ZA and provisions this piece of status change information ZA to the second digital article carrier 21*b'* only as and when the first digital article carrier 21*a'* of the first real article carrier 21*a* identifies a change in the piece of status information between two points in time.

In addition, it is particularly advantageous if both the digital autonomous guided vehicle 21*a'* determines the piece of status information Z of the assigned real autonomous guided vehicle 21*a* repeatedly (in a cyclical or event-based manner) P1 and identifies a status change of the real autonomous guided vehicle 21*a* by a change in the piece of status information Z between two queries, and the digital autonomous guided vehicle 21*b'* determines the piece of status change information ZA of the digital autonomous guided vehicle 21*a'* repeatedly (in a cyclical or event-based manner) P2. Both are preferably done by reading out the data of the inquiring unit. This means that the digital autonomous guided vehicle 21*a'* preferably reads out the piece of status information Z of the assigned real autonomous guided vehicle 21*a*, and also the digital autonomous guided vehicle 21*b'* preferably reads out the piece of status change information ZA of the digital autonomous guided vehicle 21*a'*. An active response by the inquired unit is not required in this case. Accordingly, the real autonomous guided vehicle 21*a* need not send any piece of status information Z, or piece of status change information ZA, to the digital autonomous guided vehicle 21*a'*, and also the digital autonomous guided vehicle 21*a'* need not transmit any piece of status change information ZA to the digital autonomous guided vehicle 21*b'*. The distribution of the piece of status information Z and/or of the piece of status change information ZA inside the system presented is therefore done in accordance with a uniform principle. It is also particularly advantageous in this context that the control 31 of the real autonomous guided vehicle 21*a* need not be recoded, or need be only slightly recoded, to that end. The proposed embodiment variant is therefore in particular suited for applications in heterogeneous systems, for example in systems with real autonomous guided vehicles 21*a* . . . 21*c* of different manufacturers which are each based on proprietary control software.

As already explained in relation to FIGS. 3 to 5, the piece of status change information ZA can optionally be reported to the second real article carrier of the real article carriers (here the real autonomous guided vehicle 21*b*) by the second digital article carrier (here the digital autonomous guided vehicle 21*b'*), which is assigned to the second real article carrier of the real article carriers, also in the cases represented in FIGS. 6 and 7.

In addition to the article carriers, also means for influencing the article conveyance can be provided in the picking system 1. These cause an influencing of the conveyance of the articles in the picking system 1 but do not comprise an article reception 28. One example of such a means for influencing the article conveyance is formed by the door 24 in FIG. 1. The door can be, for example, a fire protection door or a door to a cold-storage room/freezer room. This door 24, when closed, blocks the way for the autonomous guided vehicles 21*a* . . . 21*e* and, when open, enables the passing of the autonomous guided vehicles 21*a* . . . 21*e*.

In accordance with one embodiment variant, a digital means for influencing the article conveyance is generated in the digital storage and conveying region A', which digital means for influencing the article conveyance corresponds to a digital model of a real, physical means for influencing the article conveyance, wherein the digital means for influencing the article conveyance is equally stored in the computer 26. Here, an identification of a status change of the real means for influencing the article conveyance and a distribution of a piece of status change information is done in the same manner as in the case of an article carrier. The possibilities presented in FIGS. 3 to 7 can therefore be applied, without restrictions, to means for influencing the article conveyance, wherein the door 24 takes the place of the autonomous guided vehicle 21*a*, for example. Yet primary recipients of a piece of status information Z, or of a piece of status change information ZA, or units reading out such a piece of status information Z, or piece of status change information ZA, remain the article carriers (i.e. in FIGS. 3 to 7, the autonomous guided vehicles 21*b*, 21*c*). Nevertheless, also the provisioning of a piece of status information Z, or of a piece of status change information ZA, to other means for influencing the article conveyance, or a reading out of a data set by these, is conceivable.

Generally, for example a change in the pose of the first real article carrier 21*a*, a change in an electric current of a drive of the first real article carrier 21*a*, a change in a state of charge of a battery of the first real article carrier 21*a*, a change in a filling level of a fuel tank of the first real article carrier 21*a*, a change in a switching position of a switch of the first real article carrier 21*a* or a change in a sensor signal of a sensor of the first real article carrier 21*a* can be provided as status change. The examples analogously apply also to a means for influencing the article conveyance. Evidently, also a combination of status changes can be identified, in particular in a single step. For example, a status change relating to the alignment of an article carrier and a status change relating to the position of the article carrier can jointly form the basis of a piece of status change information relating to the pose of the article carrier.

Sensors that generally come into consideration (i.e. both for the article carriers and for the means for influencing the article conveyance) are, for example, a current sensor, a voltage sensor, a position sensor, an acceleration sensor, a gyro sensor, a rotary encoder, a camera, a depth sensor, an ultrasonic sensor, a laser scanner, a light barrier, a force sensor or a weight sensor. Evidently, also a combination of sensors can be used, and in particular a combination of sensors for determining and provisioning a (single) piece of status information can be used. For example, an alignment sensor and a position sensor for detecting and provisioning a piece of status information relating to the pose of an article carrier can be used.

A sensor for a door 24 that comes into consideration is in particular, for example, an open/close contact which specifies whether the door 24 is open or closed. The use of a rotary encoder in order to be able to evaluate the angular position of a (rotatably mounted) door leaf would also be conceivable. If the door 24 is a sliding door, a linear measurement means can provide information on the position of the door leaf.

Other examples of means for influencing the article conveyance are barrier tapes or barrier means, boom barriers, traffic lights, traffic signs, traffic cones, rerouting signs, warning signs, as well as information signs. In particular, these means can also be only temporarily installed in the real storage and conveying region A and/or digital storage and conveying region A' in order to indicate, for example, cleaning or maintenance work, such as, for example, dirt in the conveying region. For example, the autonomous guided vehicles 21a . . . 21e, as a rule, cannot directly identify spilled oil on the travel surface, but they can do so using the signage (put in place by the operating personnel).

Figure 8:
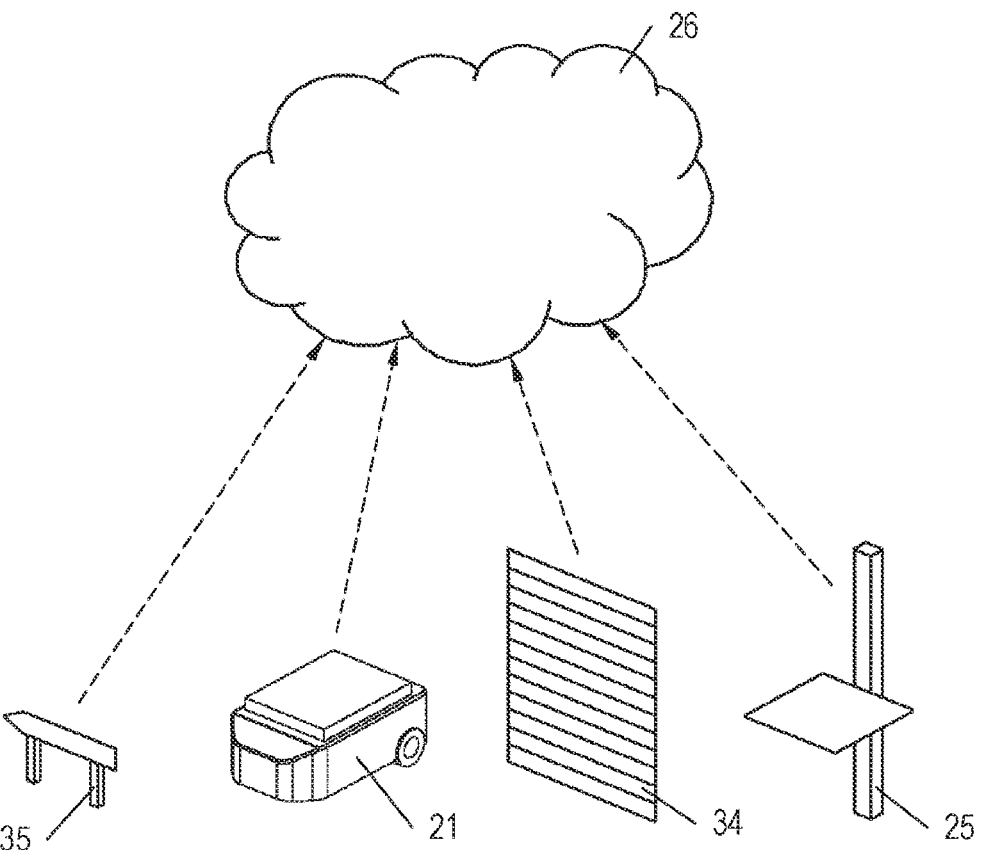
FIG. 8 an illustrative representation of possible means of a picking system, virtualized in the computer.

FIG. 8 is to illustrate that not only the autonomous guided vehicles 21a . . . 21c adduced by way of example in FIGS. 3 to 7 can be part of the proposed method, but a plurality of different article carriers and means for influencing the article conveyance can be part of the method. An autonomous guided vehicle 21 and the lift 25 as examples for article carriers and a roll-up gate 34 and a rerouting sign 35 as examples for means for influencing the article conveyance are represented there for illustration. The computer 26 is represented there as a computer network.

It should be noted in this context that the means for influencing the article conveyance can equally comprise sensors. For example, the rerouting sign 35 can comprise a position and alignment sensor 32, whereby it becomes apparent in the computer 26 with the digital image of the storage and conveying region A' where the rerouting sign 35 is installed and where it points. Yet it is also conceivable, in this case, that an installation location of the rerouting sign 35 and its orientation are identified by a camera in the storage and conveying region A. A separate position and alignment sensor 32 in the rerouting sign 35 is then obsolete. If the rerouting sign 35 is identified in a storage space, for example, it can be marked as 'inactive' and is switched to 'active' for the traffic control of the autonomous guided vehicles 21a . . . 21e only as and when it is installed in the storage and conveying region A.

It should additionally be noted that the statuses of the real article carriers 21a . . . 21c and of the real means for influencing the article conveyance 24, 34, 35 in the real storage and conveying region A can be continuously matched against and/or synchronized with the statuses of the digital article carriers 21a' . . . 21c' and of the digital means for influencing the article conveyance in the digital storage and conveying region A'. A change in a status of a real article carrier 21a . . . 21c and of a real means for influencing the article conveyance 24, 34, 35 will result in a corresponding change in the status of a digital article carrier 21a . . . 21c and of a digital means for influencing the article conveyance, and vice versa. The synchronization is done in the manner already described, by provisioning a piece of status information Z, or a status change ZA. However, it may be that individual digital article carriers 21a . . . 21c and real article carriers 21a . . . 21c obtain and/or have knowledge of merely a part, or partial aspects, of the overall status of the digital storage and conveying region A' and real storage and conveying region A, depending on which pieces of information they receive and/or request. This is of advantage whenever knowledge of the overall status is not required for the functioning of the individual digital article carrier 21a . . . 21c and of the real article carrier 21a . . . 21c, whereby the structure and the operation of the system presented are simplified.

Finally, it should further be noted that the scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

In particular, it should also be noted that, in reality, the depicted devices can also comprise more, or also fewer, components than depicted. In some cases, the shown devices and/or their components may not be depicted to scale and/or be enlarged and/or reduced in size.

| List of reference numbers | |
|---|---|
| 1 | picking system |
| 2 | building |
| 3a, 3b | article receiving area |
| 4a, 4b | article issue area |
| 5 | first storage region |
| 6 | second storage region |
| 7 | article storage |
| 8 | storage rack |
| 9a, 9b | storage and retrieval unit |
| 10a . . . 10k | article(s) |
| 11a . . . 11c | first transport loading aid |
| 12 | overhead storage conveyor |
| 13a . . . 13c | second transport loading aid/hanging bag |
| 14 | storage conveying system |
| 15a . . . 15e | storage section |
| 16 | rearranging robot |
| 17 | retrieval conveying system |
| 18a | retrieval section |
| 19 | picking station |
| 20 | article issue conveying system |
| 21, 21a . . . 21e | real autonomous guided vehicle |
| 21a' . . . 21c' | digital autonomous guided vehicle |
| 22 | article issue section |
| 23 | shipping package (target loading aid) |
| 24 | door |
| 25 | lift |
| 26 | computer |
| 27 | chassis |
| 28 | article reception/loading platform |

31

-continued

| List of reference numbers | |
|---|---|
| 29 | driven wheel |
| 30 | steerable wheel |
| 31 | (drive) control |
| 32 | position and alignment sensor |
| 33 | ultrasonic sensor |
| 34 | roll-up gate |
| 35 | rerouting sign |
| A | real storage and conveying region |
| A' | digital storage and conveying region |
| A1 | inquiry |
| P1 | query of piece of status information/ piece of status change information |
| P2 | query of piece of status information/ piece of status change information |
| Z | piece of status information |
| ZA | piece of status change information |
| ZA' | restricted piece of status change information |
| ZA" | comprehensive piece of status change information |
| Z" | comprehensive piece of status information |

The invention claimed is:

1. A method for the computer-aided processing of a status change of an article carrier having an article reception for storing and/or conveying at least one article in a picking system, in which multiple of articles are stored, conveyed and picked, comprising the steps:

generating and storing a digital storage and conveying region, which corresponds to a digital, two or three-dimensional model of a real storage and conveying region of the picking system, in a computer, generating digital article carriers, which correspond to digital article carrier models of the real article carriers, in the digital storage and conveying region, wherein the digital article carriers are also stored in the computer, and wherein position and alignment of a real article carrier in the real storage and conveying region are continuously matched and/or synchronized with the position and alignment of the assigned digital article carrier in the digital storage and conveying region and a change in position and alignment of the real article carrier results in a corresponding change in position and alignment of the digital article carrier, and vice versa, and detecting and providing a piece of status information relating to a physical status of a first real article carrier of the real article carriers using at least one sensor and/or providing a piece of status information relating to a status of a control program for the first real article carrier, the control program running in a control of the first real article carrier, by the control program, wherein the first digital article carrier of the digital article carriers, which is assigned to the first real article carrier, obtains pieces of status information of this first real article carrier provided at different points in time, and provides these pieces of status information, or a piece of status change information derived from the pieces of status information, to a second digital article carrier of the digital article carriers, or the first digital article carrier of the digital article carriers, which is assigned to the first real article carrier, obtains a piece of status change information, which describes a change in provided pieces of status information of this first real article carrier, and provides this piece of status change information, to a second digital article carrier of the digital article carriers, wherein the providing of the pieces of status information, or of the piece of status change information, is an active sending of the pieces of status information, or of the piece of status change information, to the second digital article carrier, or is a storing of the pieces of status information, or of the piece of status change information, in a store, which can be read out by the second digital article carrier.

2. The method according to claim 1, wherein a) the first digital article carrier repeatedly obtains the provided piece of status information of the assigned first real article carrier and provides this piece of status information to the second digital article carrier of the digital article carriers and wherein the second digital article carrier repeatedly obtains the status information provided by the first digital article carrier and identifies a status change of the first real article carrier by a change in the piece of status information between two points in time, or b) the first digital article carrier repeatedly obtains the provided piece of status information of the assigned first real article carrier, derives an assigned piece of status change information therefrom, and provides this piece of status change information to the second digital article carrier of the digital article carriers, or c) the first digital article carrier obtains the piece of status change information, which describes a change in the provided pieces of status information of the first real article carrier, and provides this status change information to the second digital article carrier of the digital article carriers.

3. The method according to claim 1, wherein the first real article carrier transmits the piece of status information to the first digital article carrier at different points in time and the first digital article carrier receives this piece of status information, or the first real article carrier deposits the piece of status information at different points in time and the first digital article carrier determines this piece of status information, or the first real article carrier transmits the piece of status change information to the first digital article carrier and the first digital article carrier receives this piece of status change information, or the first real article carrier deposits the piece of status change information (ZA) and the first digital article carrier determines this piece of status change information.

4. The method according to claim 1, wherein the first digital article carrier transmits the piece of status information to the second digital article carrier at different points in time and the second digital article carrier receives this piece of status information, or the first digital article carrier deposits the piece of status information at different points in time and the second digital article carrier determines this piece of status information, or the first digital article carrier transmits the piece of status change information to the second digital article carrier and the second digital article carrier receives this piece of status change information, or the first digital article carrier deposits the piece of status
change information and the second digital article car-
rier determines this piece of status change information.

5. The method according to claim 2, wherein, in case b),
the first digital article carrier derives a piece of status change
information and provides this piece of status change infor-
mation to the second digital article carrier of the digital
article carriers only as and when the first digital article
carrier identifies a status change of the first real article
carrier by a change in the piece of status information
between two points in time.

6. The method according to claim 1, wherein the status
change of the first real article carrier is reported to the
second real article carrier of the real article carriers by the
second digital article carrier which is assigned to the second
real article carrier of the real article carriers.

7. The method according to claim 1, wherein the first
digital article carrier repeatedly determines the piece of
status information of the assigned first real article carrier and
identifies a status change of the first real article carrier by a
change in the piece of status information between two
queries.

8. The method according to claim 1, wherein the second
digital article carrier repeatedly determines the piece of
status change information of the first digital article carrier.

9. The method according to claim 2, wherein, in case b),
the first digital article carrier reports merely the presence of
the status change, or a restricted piece of status change
information, to the second digital article carrier in a first step
and provides a comprehensive piece of status change infor-
mation to the second digital article carrier in a subsequent
second step.

10. The method according to claim 9, wherein the second
digital article carrier, after receiving the report on the
presence of the status change, or after obtaining the
restricted piece of status change information, sends an
inquiry including an additional piece of inquiry information
to the first digital article carrier, as to which comprehensive
pieces of status information and/or as to which comprehen-
sive pieces of status change information are to be provided
by the first digital article carrier.

11. The method according to claim 1, wherein a change in
the pose of the first real article carrier, a change in an electric
current of a drive of the first real article carrier, a change in
a state of charge of a battery of the first real article carrier,
a change in a filling level of a fuel tank of the first real article
carrier, a change in a switching position of a switch of the
first real article carrier, or a change in a sensor signal of a
sensor of the first real article carrier is provided as status
change.

12. The method according to claim 1, wherein a current
sensor, a voltage sensor, a position sensor, an acceleration
sensor, a gyro sensor, a rotary encoder, a camera, a depth
sensor, an ultrasonic sensor, a laser scanner, a light barrier,
a force sensor, or a weight sensor is provided as the at least
one sensor.

13. The method according to claim 1, wherein a digital
means for influencing the article conveyance, which corre-
sponds to a digital model of a real means for influencing the
article conveyance, is generated in the digital storage and
conveying region, wherein the digital means for influencing
the article conveyance is also stored in the computer and
wherein the real means for influencing the article convey-
ance is configured to influence the conveyance of the articles
in the picking system but does not comprise an article
reception, and wherein an identification of a status change of
the real means for influencing the article conveyance and an exchange of information between a means for influencing
the article conveyance and an article carrier is done in the
same manner as between two article carriers.

14. The method according to claim 13, wherein
a piece of status information relating to a physical status
of the real means for influencing the article conveyance
using at least one sensor and/or a piece of status
information relating to a status of a control program for
the real means for influencing the article conveyance is
provided, wherein the control program runs in a control
of the real means for influencing the article convey-
ance, and
the digital means for influencing the article conveyance,
which is assigned to the real means for influencing the
article conveyance, obtains pieces of status information
of this real means for influencing the article convey-
ance are provided at different points in time, and
provides these pieces of status information, or a piece
of status change information derived from the pieces of
status information, to a second digital article carrier of
the digital article carriers, or the digital means for
influencing the article conveyance, which is assigned to
the real means for influencing the article conveyance,
obtains a piece of status change information, which
describes a change in provided pieces of status infor-
mation of this real means for influencing the article
conveyance, and provides this piece of status change
information to a second digital article carrier of the
digital article carriers.

15. The method according to claim 14, wherein
i) the digital means for influencing the article conveyance
repeatedly obtains the provided piece of status infor-
mation of the assigned real means for influencing the
article conveyance and provides this piece of status
information to the second digital article carrier of the
digital article carriers and that wherein the second
digital article carrier repeatedly obtains the piece of
status information provided by the digital means for
influencing the article conveyance and identifies a
status change of the real means for influencing the
article conveyance by a change in the piece of status
information between two points in time, or
ii) the digital means for influencing the article conveyance
repeatedly obtains the provided piece of status infor-
mation of the assigned real means for influencing the
article conveyance, derives an assigned piece of status
change information therefrom, and provides this piece
of status change information to the second digital
article carrier of the digital article carriers, or
iii) the digital means for influencing the article convey-
ance obtains the piece of status change information,
which describes a change in the provided pieces of
status information of the real means for influencing the
article conveyance, and provides this piece of status
change information to the second digital article carrier
of the digital article carriers.

16. The method according to claim 14, wherein
the real means for influencing the article conveyance
transmits the piece of status information to the digital
means for influencing the article conveyance at differ-
ent points in time and the digital means for influencing
the article conveyance receives this piece of status
information, or
the real means for influencing the article conveyance
deposits the piece of status information at different points in time and the digital means for influencing the article conveyance determines this piece of status information, or the real means for influencing the article conveyance transmits the piece of status change information to the digital means for influencing the article conveyance and the digital means for influencing the article conveyance receives this piece of status change information, or the real means for influencing the article conveyance deposits the piece of status change information and the digital means for influencing the article conveyance determines this piece of status change information.

17. The method according to claim 14, wherein the digital means for influencing the article conveyance transmits the piece of status information to the second digital article carrier at different points in time and the second digital article carrier receives this piece of status information, or the digital means for influencing the article conveyance deposits the piece of status information at different points in time and the second digital article carrier determines this piece of status information, or the digital means for influencing the article conveyance transmits the piece of status change information to the second digital article carrier and the second digital article carrier receives this piece of status change information, or the digital means for influencing the article conveyance deposits the piece of status change information and the second digital article carrier determines this piece of status change information.

18. The method according to claim 15, wherein, in case ii), the digital means for influencing the article conveyance derives a piece of status change information and provides this piece of status change information to the second digital article carrier of the digital article carriers only as and when the digital means for influencing the article conveyance identifies a status change of the real means for influencing the article conveyance by a change in the piece of status information between two points in time.

19. The method according to claim 14, wherein the status change of the real means for influencing the article conveyance is reported to the second real article carrier by the second digital article carrier, which is assigned to the second real article carrier.

20. The method according to claim 14, wherein the digital means for influencing the article conveyance repeatedly determines the piece of status information of the assigned real means for influencing the article conveyance and identifies a status change of the real means for influencing the article conveyance by a change in the piece of status information between two queries.

21. The method according to claim 14, wherein the second digital article carrier repeatedly determines the piece of status change information of the digital means for influencing the article conveyance.

22. The method according to claim 15, wherein, in case ii), the digital means for influencing the article conveyance reports merely the presence of the status change, or a restricted piece of status change information, to the second digital article carrier in a first step and provides a comprehensive piece of status change information to the second digital article carrier in a subsequent second step.

23. The method according to claim 22, wherein the second digital article carrier, after receiving the report on the presence of the status change, or after obtaining the restricted piece of status change information, sends an inquiry including an additional piece of inquiry information to the digital means for influencing the article conveyance, as to which comprehensive pieces of status information and/or as to which comprehensive pieces of status change information are to be provided by the digital means for influencing the article conveyance.

24. A picking system for storing, conveying and picking multiple articles, comprising a real storage and conveying region, multiple real article carriers, each having an article reception for storing and/or conveying at least one article of the articles in the picking system, a computer for generating and storing a digital storage and conveying region, which corresponds to a digital, two or three-dimensional model of the real storage and conveying region, and for generating and storing digital article carriers in the digital storage and conveying region, which correspond to digital article carrier models of the real article carriers, wherein position and alignment of a real article carrier in the real storage and conveying region are continuously matched and/or synchronized with the position and alignment of the assigned digital article carrier in the digital storage and conveying region and a change in position and alignment of the real article carrier results in a corresponding change in position and alignment of the digital article carrier, and vice versa, at least one sensor for detecting and providing a piece of status information relating to a physical status of a first real article carrier of the real article carriers and/or a control of a first real article carrier of the real article carriers, wherein a control program for the first real article carrier is executable in the control, wherein a piece of status information relating to a status of same is providable by the control program, wherein in the computer, a program is executable in order to obtain pieces of status information of this first real article carrier provided at different points in time in the first digital article carrier of the digital article carriers, which is assigned to the first real article carrier, and provide these pieces of status information, or a piece of status change information derived from the pieces of status information, to a second digital article carrier of the digital article carriers, or in the computer, a program is executable in order to obtain a piece of status change information, which describes a change in provided pieces of status information of this first real article carrier, in the first digital article carrier of the digital article carriers, which is assigned to the first real article carrier, and provide this piece of status change information to a second digital article carrier of the digital article carriers, wherein the providing of the pieces of status information, or of the piece of status change information, is an active sending of the pieces of status information, or of the piece of status change information, to the second digital article carrier, or is a storing of the pieces of status information, or of the piece of status change information, in a store, which can be read out by the second digital article carrier.

* * * * *